United States Patent
Beall et al.

(10) Patent No.: US 7,927,682 B2
(45) Date of Patent: Apr. 19, 2011

(54) LOW-MICROCRACKED, POROUS CERAMIC HONEYCOMBS AND METHODS OF MANUFACTURING SAME

(75) Inventors: Douglas Munroe Beall, Painted Post, NY (US); Isabelle Marie Melscoet-Chauvel, Painted Post, NY (US); Gregory Albert Merkel, Corning, NY (US); Tinghong Tao, Big Flats, NY (US); David John Thompson, Savona, NY (US)

(73) Assignee: Corning Incorporated, Corning, NY (US)

( * ) Notice: Subject to any disclaimer, the term of this patent is extended or adjusted under 35 U.S.C. 154(b) by 880 days.

(21) Appl. No.: 11/823,709

(22) Filed: Jun. 28, 2007

(65) Prior Publication Data

US 2008/0032091 A1 Feb. 7, 2008

Related U.S. Application Data

(60) Provisional application No. 60/840,806, filed on Aug. 29, 2006, provisional application No. 60/817,722, filed on Jun. 30, 2006.

(51) Int. Cl.
*B32B 3/12* (2006.01)
*B01D 39/06* (2006.01)
*B01D 39/14* (2006.01)

(52) U.S. Cl. .......... 428/116; 428/117; 428/118; 55/523; 55/524

(58) Field of Classification Search ........................ None
See application file for complete search history.

(56) References Cited

U.S. PATENT DOCUMENTS

| | | | |
|---|---|---|---|
| 3,885,977 A | 5/1975 | Lachman et al. | 106/62 |
| 4,015,048 A | 3/1977 | Martin | 428/428 |
| 4,063,955 A | 12/1977 | Fritsch, Jr. et al. | 106/39 |
| 4,189,327 A | 2/1980 | Winchester, Jr. | 106/60 |
| 4,191,583 A | 3/1980 | Armistead et al. | 106/39.6 |
| 4,219,344 A | 8/1980 | Armistead et al. | 65/18 |
| 4,225,354 A | 9/1980 | Rao | 106/39.8 |
| 4,235,617 A | 11/1980 | Rao | 65/18 |
| 4,235,855 A | 11/1980 | Cleveland | 423/327 |
| 4,435,512 A | 3/1984 | Ito et al. | 501/32 |

(Continued)

FOREIGN PATENT DOCUMENTS

WO 2007/064433 6/2007

(Continued)

OTHER PUBLICATIONS

Roberts et al., "Elastic Properties of Model Porous Ceramics", J. Am. Ceram. Soc., 83 [12] 3041-48 (2000).

*Primary Examiner* — Gordon R Baldwin
(74) *Attorney, Agent, or Firm* — Randall S. Wayland; Matthew B. McNutt; Matthew J. Mason

(57) ABSTRACT

Substantially non-microcracked, porous, cordierite ceramic honeycomb bodies are provided. Although exhibiting moderately high thermal expansion (CTE) between $7 \times 10^{-7}$ to $16 \times 10^{-7}/°$ C. (25-800° C.), the honeycomb bodies exhibit relatively high thermal shock parameter (TSP), such as $TSR \geq 525°$ C. by virtue of a high MOR/E ratio, and/or low $E_{ratio} = E_{RT}/E_{1000° C}$. and well interconnected porosity, as witnessed by a relatively high pore connectivity factor (PCF). A method of manufacturing the honeycomb ceramic structure is also provided.

54 Claims, 15 Drawing Sheets

U.S. PATENT DOCUMENTS

| | | | |
|---|---|---|---|
| 4,476,236 A | 10/1984 | Inoguchi et al. | 501/118 |
| 4,745,092 A | 5/1988 | Prunier, Jr. | 501/119 |
| 4,810,681 A | 3/1989 | Hayakawa | 501/119 |
| 5,030,592 A | 7/1991 | Komarneni et al. | 501/9 |
| 5,532,194 A | 7/1996 | Kawashima et al. | 501/9 |
| 5,549,725 A | 8/1996 | Kasai et al. | 55/523 |
| 5,552,349 A | 9/1996 | Ichii et al. | 501/9 |
| 5,607,885 A | 3/1997 | Ichii et al. | 501/9 |
| 6,004,501 A | 12/1999 | Cornelius et al. | 264/631 |
| 6,300,263 B1 | 10/2001 | Merkel | 501/9 |
| 2005/0239640 A1 | 10/2005 | Nilsson et al. | 502/202 |

FOREIGN PATENT DOCUMENTS

| | | |
|---|---|---|
| WO | 2007/064497 | 6/2007 |
| WO | 2007/075333 | 7/2007 | even in substrates and filters prepared using relatively coarse raw materials and pore formers to achieve higher porosities.

LOW-MICROCRACKED, POROUS CERAMIC HONEYCOMBS AND METHODS OF MANUFACTURING SAME

RELATED INVENTIONS

This application claims priority to, and the benefit of, U.S. Provisional Application Ser. No. 60/840,806 filed Aug. 29, 2006 entitled "Non-Microcracked, Thermally Durable, Porous Ceramics," U.S. Provisional Application Ser. No. 60/817,722 filed Jun. 30, 2006 entitled "High Porosity Filters for 4-Way Exhaust Gas Treatment," and U.S. patent application Ser. No. 11/544,271 filed Oct. 6, 2006 and entitled "High Porosity Filters for 4-Way Exhaust Gas Treatment."

FIELD OF THE INVENTION

The present invention is directed to porous honeycomb ceramics and methods of manufacturing same, and more particularly porous cordierite honeycomb ceramics useful in catalytic converters and particulate filters, such as for engine exhaust after-treatment.

BACKGROUND OF THE INVENTION

Porous ceramic honeycomb structures are widely used as catalytic converter substrates and/or diesel particulate filters. The earliest cordierite ceramic honeycombs for these applications consisted of reaction-sintered cordierite substrates prepared from extruded mixtures of talc, alumina, and kaolin such as described in U.S. Pat. No. 3,885,977, for example. These were found to have suitable chemical durability, inertness, refractoriness, and thermal shock resistance for the application, and were generally cost effective to manufacture. For purposes of the present description the term "cordierite" used alone refers to orthorhombic cordierite (orthorhombic $Mg_2Al_4Si_5O_{18}$ and its solid solutions), indialite (hexagonal $Mg_2Al_4Si_5O_{18}$ and its solid solutions), and mixtures thereof unless expressly stated otherwise.

The high thermal shock resistance of reaction-sintered cordierite ceramics, which is proportional to the ratio of the modulus of rupture (MOR) to the elastic (Young's) modulus (E) of the ceramic and inversely proportional to the coefficient of thermal expansion (CTE) of the ceramic, is attributed to the development of a specific microstructure during firing that depends on an appropriate choice of raw materials, as well as on the forming and firing methods employed. Desirably, the cordierite crystallites within the ceramic will tend to be preferentially oriented with their negative-expansion z-axes aligned near the plane of the wall, thereby reducing the CTE in the axial and radial directions of the honeycomb.

Further, the development of large (>50 µm) fan-like "domains" of radiating prismatic cordierite crystallites creates internal stresses during cooling that produce microcracks throughout the body. The re-closing of these microcracks during subsequent reheating accommodates some of the expansion of the positive-CTE x- and y-axes of the cordierite crystals, thereby further lowering the overall CTE of the body. The very low CTE which results by virtue of preferred orientation and high degree of microcracking has been considered essential to the thermal durability of the substrates.

The technology developed for catalytic converter substrates is generally adaptable to ceramic diesel particulate filters (DPFs). A monolithic DPF may be prepared from a porous ceramic honeycomb by plugging adjacent channels on alternative ends for example, such as in a checkerboard pattern, to form a "wall-flow" filter with inlet and outlet channels. That structure forces entering exhaust gas to pass through the porous honeycomb walls to traverse the wall structure, thereby acting to collect exhaust particulates, such as soot, on the walls of the inlet channels. Relative to converter substrates, which have a relatively low porosity (25-35%) and fine pore size (about 4 µm median pore size) suitable for the application and adherence of catalyst washcoats, DPFs of the prior art have required a higher porosity and coarser pore size to reduce the back pressure through the wall. This has been achieved by utilizing coarser talc and coarser silica raw materials in conjunction with the addition of a coarse pore former (e.g., graphite powder). The pore former burns out of the walls during firing and contributes to obtaining high porosity.

Recent trends in exhaust after-treatment for both gasoline and diesel engines have placed greater demands on the converters and DPFs. For converters, the shift toward higher cell densities and thinner walls (e.g., 900/2) has created challenges in meeting requirements for strength and erosion resistance. The most recent applications requiring low cell densities and thin walls (e.g., 300/4 or 600/3 configurations (cpsi/$t_{wall}$)) for reduced back pressure offer similar challenges, as does the growing interest in higher porosity converters with lower thermal mass for faster light-off to meet emission standards.

Likewise, whereas 45%-50% porosity has been adequate in the past for DPFs used in retrofit applications, the move toward catalyzed DPFs may require even higher porosities and coarser pore diameters to accommodate the catalyst within the porous walls. Porosities as high as 60%-70% and pore diameters of 20-25 µm are being considered.

All of these trends increase honeycomb strength requirements, yet the need to secure low CTEs in cordierite ceramic honeycombs has continued to dictate that microcracking necessarily be present. Microcracking may place a limit on the maximum strength achievable in the ceramic matrix itself. Thus, changes in the honeycomb cell geometry, such as filleting the wall intersections or providing thicker walls near the periphery of the honeycomb near the skin, have been employed to improve the strength of the body in thin wall designs.

A second problem arising from the use of converters and DPFs comprising microcracked cordierite may be the penetration of very fine catalyst washcoat particles into the microcracks formed in the cordierite matrix. The presence of particles within the microcracks may interfere with closure of the microcracks during heating, essentially pinning the cracks open. This may result in an increase in CTE, and also an increase in elastic modulus, both factors contributing to reduced thermal shock resistance. This may be especially problematic for DPFs, where the catalyst washcoats are normally disposed within the porous walls of the filters.

Finally, the high degree of preferred "planar" orientation of cordierite required for low CTE can also present issues in cases where the degree of preferred orientation between the skin and the cellular matrix is different. This can occur due to a different degree of alignment of the platy raw materials resulting from different shear and flow in the skin and matrix during extrusion through the die. Because of the difference in cordierite orientation, the skin and matrix may have different CTEs. Consequently, during cooling from firing, the skin and matrix can contract at different rates, creating tensile stresses within the skin that may lead to the formation of cracks therein. These cracks may reduce both strength and thermal shock resistance.

Based upon the above discussion, it is apparent that, while microcracking and preferred crystallite orientation have been essential in the past for achieving low CTE combined with high thermal shock resistance in reaction-sintered cordierite ceramics, both of these microstructural features can also create problems that may limit the utility of the material for certain applications. For example, microcracking may result in strength reductions, and may facilitate CTE increases where the microcracks are penetrated by catalysts or particulates. Additionally, variable cordierite domain alignment can result in residual stresses in cordierite honeycombs.

SUMMARY OF THE INVENTION

The present invention ameliorates or reduces such issues associated with prior art, highly microcracked materials. Accordingly, the present invention relates to a substantially non-microcracked, porous, cordierite ceramic honeycomb body. According to embodiments of the invention, the cordierite ceramic honeycomb bodies exhibit high thermal shock resistance and low coefficient of thermal expansion. Further, the bodies may exhibit high strain tolerance by virtue of a relatively high ratio of MOR/E at room temperature. More particularly, the inventive bodies, in accordance with embodiments, exhibit a thermal shock parameter (TSP) value of at least 400° C., combined with relatively low CTE (25° C.-800° C.)$\leq 15 \times 10^{-7}$/° C., wherein TSP is defined by the equation:

$$TSP=MOR_{RT}/[E_{RT}][CTE_H],$$

wherein $MOR_{RT}$ corresponds to the modulus of rupture of the cordierite ceramic in 4-point bending at room temperature, and $CTE_H$ corresponds to the mean value of the high temperature coefficient of thermal expansion of the material, that coefficient being or calculated on heating over the temperature range of 500° C. to 900° C. The walls of the honeycomb bodies may have a random or preferred cordierite crystal orientation, although it has been discovered that a preferred orientation (cordierite crystal z-axes parallel to the wall surfaces) in accordance with an alternative aspect of the invention provides relatively lower CTE as compared to random crystal orientation.

Additionally, and in another broad aspect of the invention, a porous ceramic honeycomb structure is provided, comprising a primary cordierite ceramic phase exhibiting a room temperature elastic modulus ($E_{RT}$) at 25° C., and a high temperature elastic modulus ($E_H$) at 1000° C., and an $E_{ratio\ 1000} \leq 1.05$, wherein $E_{ratio\ 1000}=E_H/E_{RT}$, and
TSP$\geq$525° C. wherein the thermal shock parameter (TSP) is defined as $$TSP=MOR_{RT}/[E_{RT}][CTE_H]$$

($MOR_{RT}$) is a room temperature modulus of rupture strength, and ($CTE_H$) is high temperature thermal expansion coefficient between 500° C. and 900° C. MOR, E, and CTE are all measured on a cellular specimen parallel to the length of the channels, also referred to as the axial direction. $E_H$ is measured during heating from room temperature. Additionally, the invention may exhibit $E_{Ratio\ 1000} \leq 1.01$, $E_{Ratio\ 1000} \leq 1.00$, $E_{Ratio\ 1000} \leq 0.98$, $E_{Ratio\ 1000} \leq 0.95$, or even $E_{Ratio\ 1000} \leq 0.93$. Further, the honeycomb structures of the invention may exhibit relative low CTE, such as CTE (25-800° C.)$\leq 18 \times 10^{-7}$/° C., CTE (25-800° C.)$\leq 16 \times 10^{-7}$/° C., CTE (25-800° C.)$\leq 15 \times 10^{-7}$/° C., CTE (25-800° C.)$\leq 14 \times 10^{-7}$/° C., CTE (25-800° C.)$\leq 12 \times 10^{-7}$/° C., CTE (25-800° C.)$\leq 10 \times 10^{-7}$/° C., or even CTE (25-800° C.)$\leq 9 \times 10^{-7}$/° C. In addition to $E_{ratio\ 1000} \leq 1.05$ and TSP$\geq$525° C., as described above, further embodiments of the invention may be characterized by a pore microstructure of the porosity further including a relatively narrow pore size distribution. In particular, embodiments may additionally include a narrow pore size distribution wherein a porosity d-factor ($d_f$), defined by the equation $d_f=(d_{50}-d_{10})/d_{50}$, may be $d_f \leq 0.48$, $d_f \leq 0.40$, $d_f \leq 0.37$, $d_f \leq 0.35$, $d_f \leq 0.30$, $d_f \leq 0.28$, or even $d_f \leq 0.25$. Furthermore, the narrowness of the pore size distribution of the low microcracked honeycomb may be further defined by a pore microstructure wherein the overall pore size breadth ($d_b$), defined as $d_b=(d_{90}-d_{10})/d_{50}$, may be $d_b \leq 1.65$, $d_b \leq 1.23$, $d_b \leq 1.21$, $d_b \leq 1.15$, $d_b \leq 1.00$, $d_b \leq 0.90$, $d_b \leq 0.80$, or even $d_b \leq 0.70$. Lowering $d_b$ increases filtration efficiency for filters, and strength for both filter and substrate applications.

Furthermore, the walls of the porous ceramic honeycombs of the invention may further include a preferred orientation wherein the cordierite crystallites in walls of the honeycomb structure have an preferred orientation exhibiting $\Delta_I > 0.1$ wherein $\Delta_I = I_T - I_A$. In particular, the structure may include $I_A \leq 0.6$, $I_A \leq 0.5$, or even $I_A \leq 0.4$. Additionally, for oriented examples, the structure may include $I_T \geq 0.7$, or even $I_A \geq 0.8$. The preferred orientation of the low-microcracked honeycomb reduces CTE in at least one direction. Furthermore, the cordierite structural honeycomb bodies of the present invention additionally may exhibit high pore connectivity, as defined by a Pore Connectivity Factor (PCF), defined by the relationship PCF=% P/($d_b$), wherein PCF may be PCF$\geq$40%, PCF$\geq$45%, PCF$\geq$50%, or even PCF$\geq$55%. Moreover, PCF$\geq$60%, PCF$\geq$70%, PCF$\geq$80% or even PCF$\geq$90% have been demonstrated according to selected embodiments of the invention.

In certain embodiments, the cordierite bodies are useful in the form of honeycomb ceramic substrates useful as flow-through substrates (non-plugged embodiments) for the support of gasoline engine emissions control catalysts. For some of these applications, the honeycomb ceramic bodies may require relatively higher porosity, for example to accommodate catalyst storage within the honeycomb channel walls. Likewise, relatively higher porosity is required to provide high wall permeability for plugged ceramic honeycomb wall-flow filters (particulate filters) used for diesel engine exhaust treatment. In such relatively high porosity applications, the honeycomb ceramic bodies may have total porosities (% P) wherein % P$\geq$46%, or even % P$\geq$50%. In some embodiments, % P$\geq$55%, % P$\geq$60%, % P$\geq$65%, or even % P$\geq$70% is demonstrated. Certain applications for fast light-off catalyst flow-through substrates which exhibit thin walls (e.g., less than 10 mils, less than 7 mils, or even less than 6 mils or 4 mils) may require total porosity greater than 46%, greater than 50%, or even greater than 55%.

According to another aspect, the invention is a method for making a porous ceramic honeycomb structure, comprising the steps of mixing inorganic raw materials, an organic binder, and a liquid vehicle to form a plasticized batch, forming a green body from the plasticized batch, drying the green body, and firing the body to provide a cordierite ceramic structure having relatively low microcracking and relatively high thermal shock by exhibiting $E_{ratio} \leq 1.05$ and TSP$\geq$525° C.

According to another aspect, the invention is porous ceramic honeycomb structure, comprising a primary cordierite ceramic phase exhibiting low microcracking as exhibited by $\Delta\alpha_{mc} \leq 5.0$, CTE (25-800° C.)$\leq 15 \times 10^{-7}$/° C., and % P$\geq$46%.

BRIEF DESCRIPTION OF THE DRAWINGS

The invention is further described below with reference to the attached drawings, wherein.

DETAILED DESCRIPTION OF THE EMBODIMENTS

Figure 1:
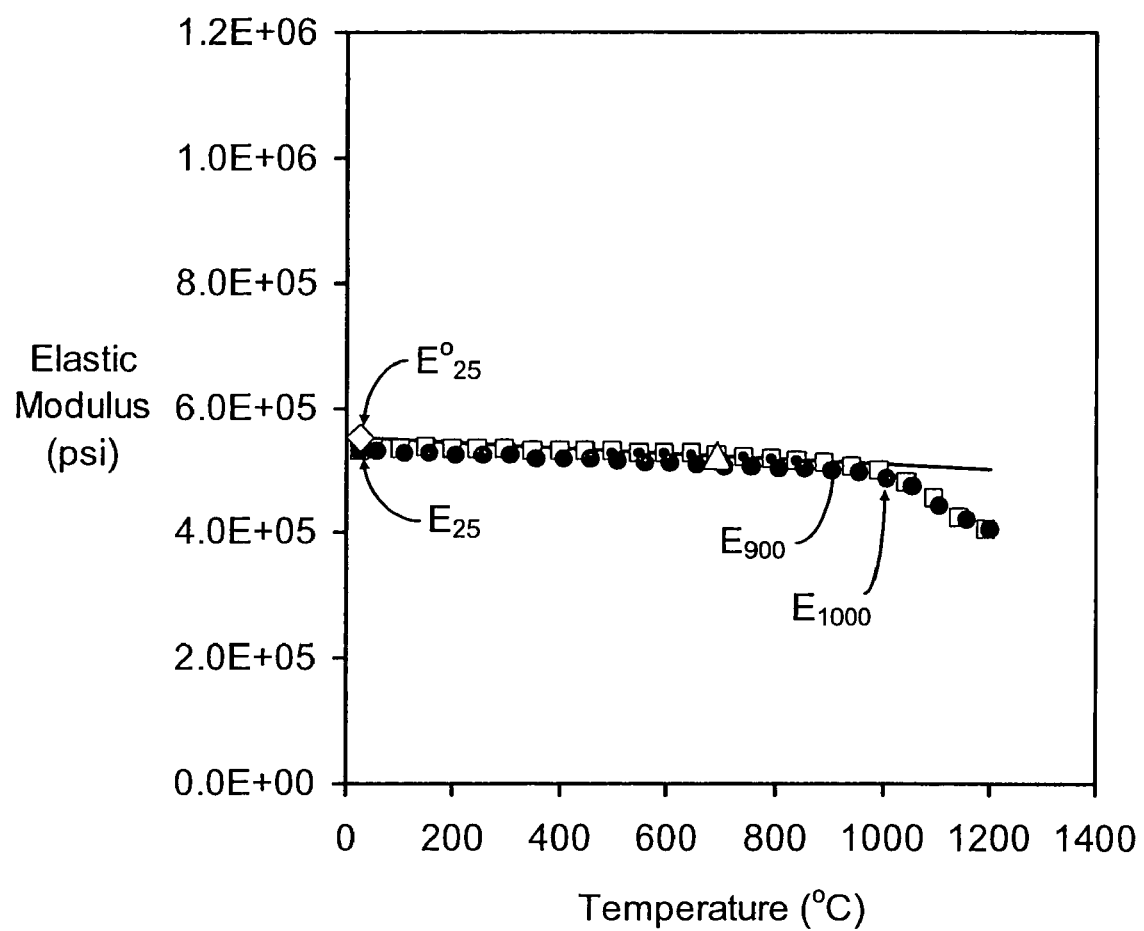
FIG. 1 is a plot of the elastic modulus (psi) versus temperature (° C.) during heating and cooling of an inventive low microcracked cordierite embodiment of the invention.
Figure 2:
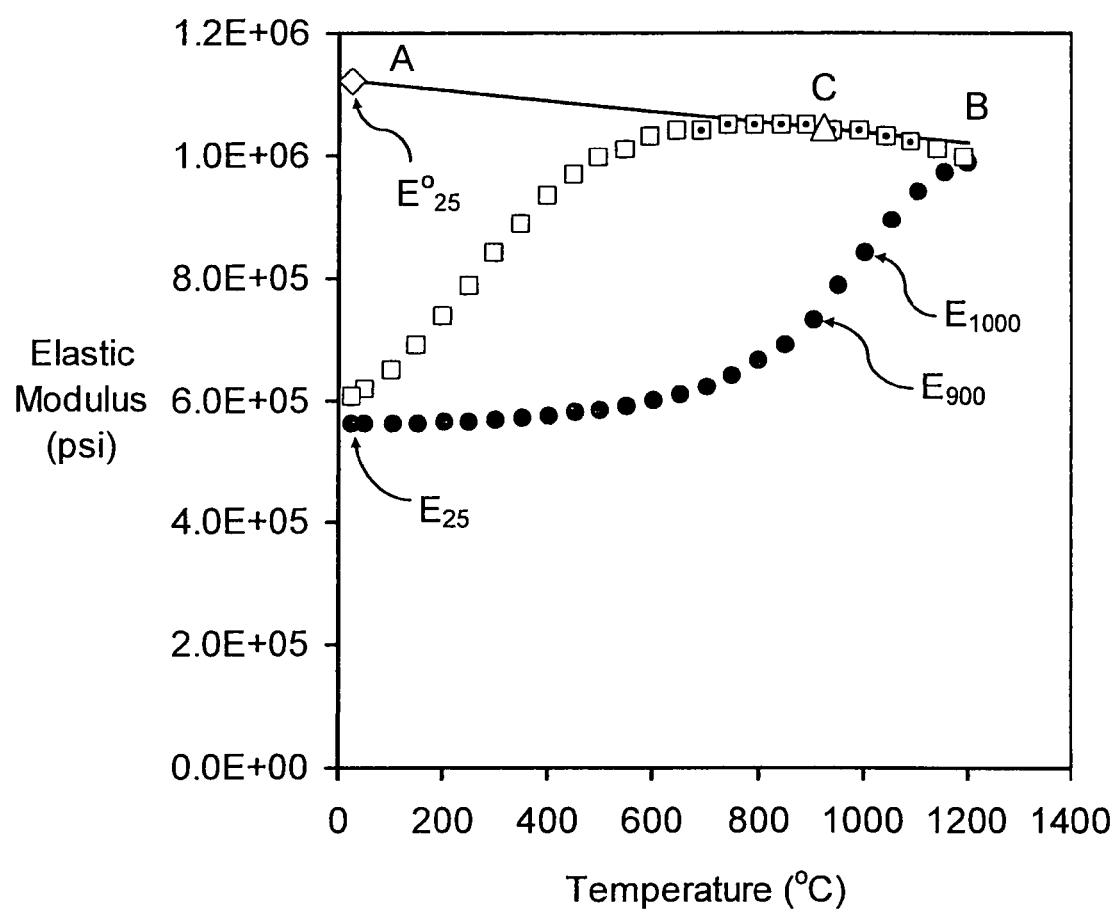
FIG. 2 is a plot of the elastic modulus (psi) versus temperature (° C.) during heating and cooling of a comparative "Prior Art" example.

Securing a relatively low ratio of elastic modulus, $E_{ratio\ 1000} = E_{H\ 1000° C.}/E_{RT}$ in the cordierite ceramic honeycomb bodies of the invention is achieved by providing bodies formed of a substantially non-microcracked porous, cordierite ceramic material. $E_{ratio\ 1000}$ values above 1.00 and below 1.05 are indicative of very minor, but tolerable, levels of microcracking (see FIG. 1), i.e., substantially non-microcracked bodies. $E_{ratio\ 1000}$ values above 1.05 are indicative of relatively higher levels of microcracking (FIG. 2) which are less desirable in order to avoid adversely affecting product performance attributes, such as strength and insensitivity of thermal shock resistance to catalyzation. FIG. 1 is a plot of the elastic modulus (psi) versus temperature (° C.) during heating and cooling of an inventive low microcracked cordierite example of the invention (141). Filled circles therein denote heating data, open squares denote cooling data, small filled circles within open squares denote data that were fit by a polynomial to derive the point of tangency (open triangle) and the tangent line (solid line), and open diamond is the value of the tangent at room temperature, $E^O_{25}$. Also noted are the values of $E_{25}$, $E_{900}$, and $E_{1000}$ (elastic modulus at 25, 900, and 1000° C.) during heating as will be referred to herein. FIG. 2 is a plot of the elastic modulus (psi) versus temperature (° C.) during heating and cooling of a comparative "Prior Art" example (C4). Filled circles denote heating data, open squares denote cooling data, small filled circles within open squares denote data that were fit by a polynomial to derive the point of tangency (open triangle, point C) and the tangent line (solid line A-B), and open diamond is the value of the tangent at room temperature, $E^O_{25}$. Also noted are the values of $E_{25}$, $E_{900}$, and $E_{1000}$ (elastic modulus at 25, 900, and 1000° C.) during heating.

Therefore, in accordance with embodiments of the invention, values of $E_{ratio\ 1000}$ of less than or equal to 1.05 are desired, and values of $E_{ratio\ 1000}$ defined as $E_{H\ 1000}/E_{RT} \leq 1.01$ or even $E_{H\ 1000}/E_{RT} \leq 1.00$ are more desired. However, in accordance with embodiments of the invention, $E_{ratio\ 1000} \leq 0.98$, $E_{ratio\ 1000} \leq 0.96$, $E_{ratio\ 1000} \leq 0.95$, or even $E_{ratio\ 1000} \leq 0.93$ are demonstrated. These are exemplary of relatively low levels of microcracking. High temperature elastic modulus values may be determined by referring to ASTM C 1198-01 or co-pending U.S. patent application Ser. No. 11/823,138 filed Jun. 27, 2007 and entitled "Methods And Apparatus For Measuring Elastic Modulus Of Non-Solid Ceramic Materials By Resonance," the disclosure of which is hereby incorporated by reference herein.

The Thermal Shock Limit (TSL) of ceramic honeycomb bodies according to the invention is conventionally considered to be the maximum temperature to which the center of the body can be heated when the surface of the body is 500° C., without suffering cracking damage. TSL may be estimated by adding 500° C. to the value of Thermal Shock Parameter (TSP) as hereinabove defined. In other words, TSL=TSP+500° C. Illustrating improved thermal shock limit (TSL) in accordance with another aspect of the invention, therefore, are values of TSP achieved by embodiments of the invention which are TSP≧400° C., TSP≧450° C., TSP≧525° C., TSP≧550° C., and even TSP≧600° C. In some embodiments, TSP≧700° C. (see examples 4-6, 8-9, 11, 13-14, 27-32, 35-39, 41-43, and 46), TSP≧800° C. (see examples 4, 6, 13-15, 18, 20, 27-28, 31, 36-39, and 41-43), TSP≧900° C. (see examples 14, 18, 27-28, 31, 37-38, and 41-42), and even TSP≧1000° C. (see examples 18, 27, and 41) are achieved.

Figure 3:
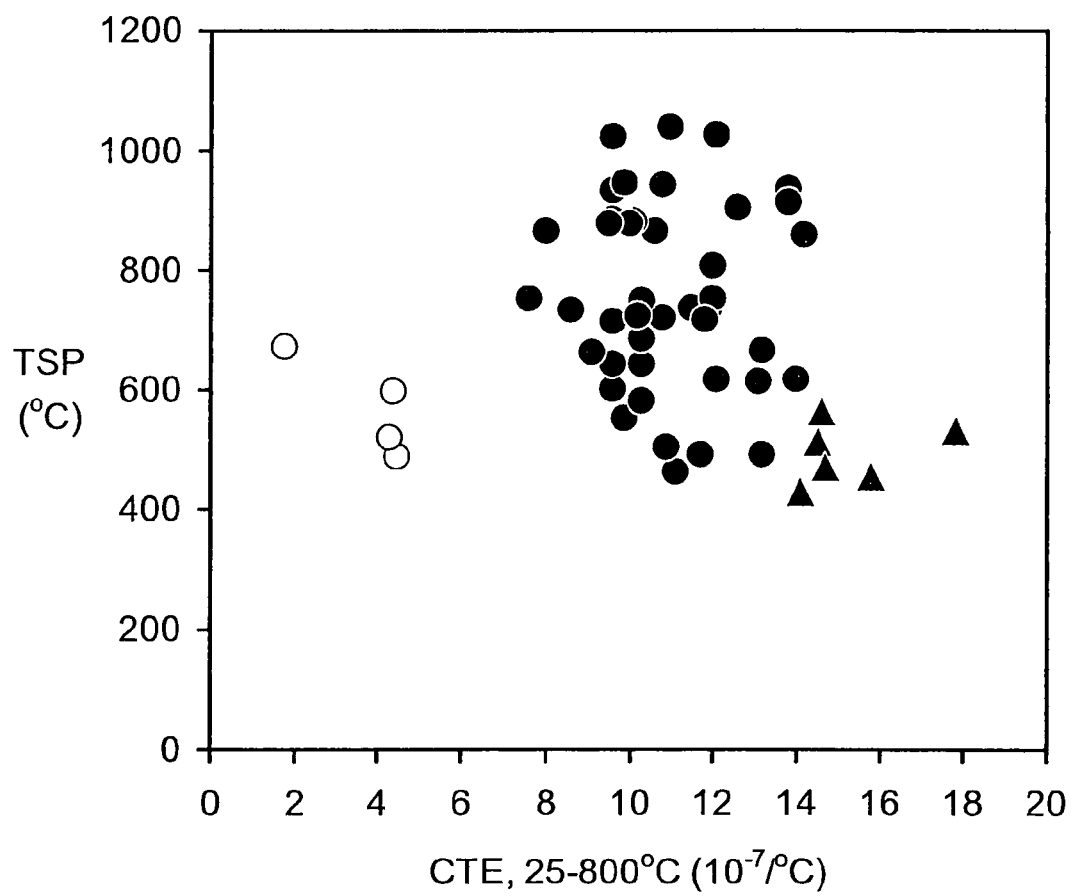
FIG. 3 plots the TSP (° C.) versus CTE ($10^{-7}$/° C.) from 25-800° C. for inventive (filled circles and triangles) and comparative (open circles) examples.

Moreover, in certain embodiments, the present invention low microcracked honeycombs achieve a desirable combination of both relatively low CTE and high TSP. For example, in accordance with a broad aspect of the invention, a low microcracked honeycomb including a combination of TSP≧400° C. and CTE (25-800° C.)≦18×$10^{-7}$/° C., or even CTE (25-800° C.)≦15×$10^{-7}$/° C. are achieved by embodiments of the invention (FIG. 3). Certain examples achieve a combination of even lower CTE and higher TSP. For example, a combination of TSP≧500° C. and CTE (25-800° C.)≦15×$10^{-7}$/° C. are achieved by many embodiments of the invention (See examples 2-9, 11-22, 27-39, and 41-48). In some embodiments, excellent combinations of TSP≧525° C. and CTE (25-800° C.)≦15×$10^{-7}$/° C. are achieved. In some embodiments, a combination of TSP≧600° C. and CTE (25-800° C.)≦15×$10^{-7}$/° C., or even TSP≧700° C. and CTE (25-800° C.)≦13×$10^{-7}$/° C., are achieved.

Figure 4:
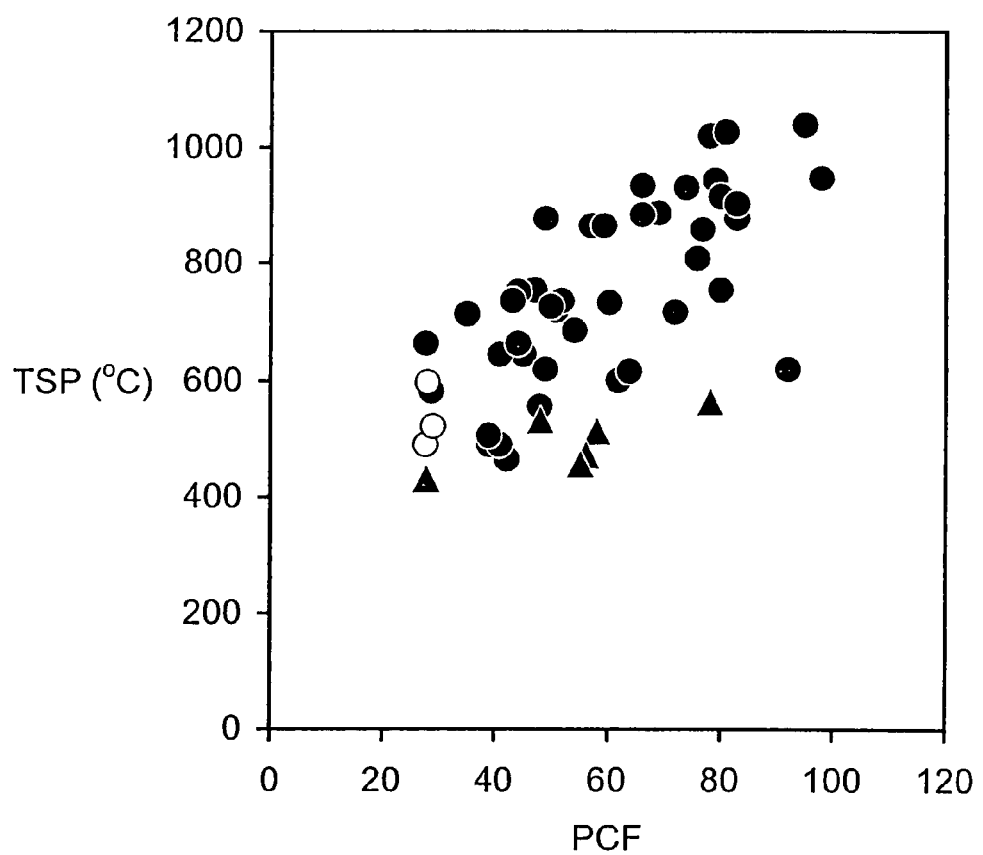
FIG. 4 plots the TSP (° C.) versus pore connectivity factor, PCF (%), for inventive (filled circles and triangles) and comparative (open circles) examples.
Figure 5:
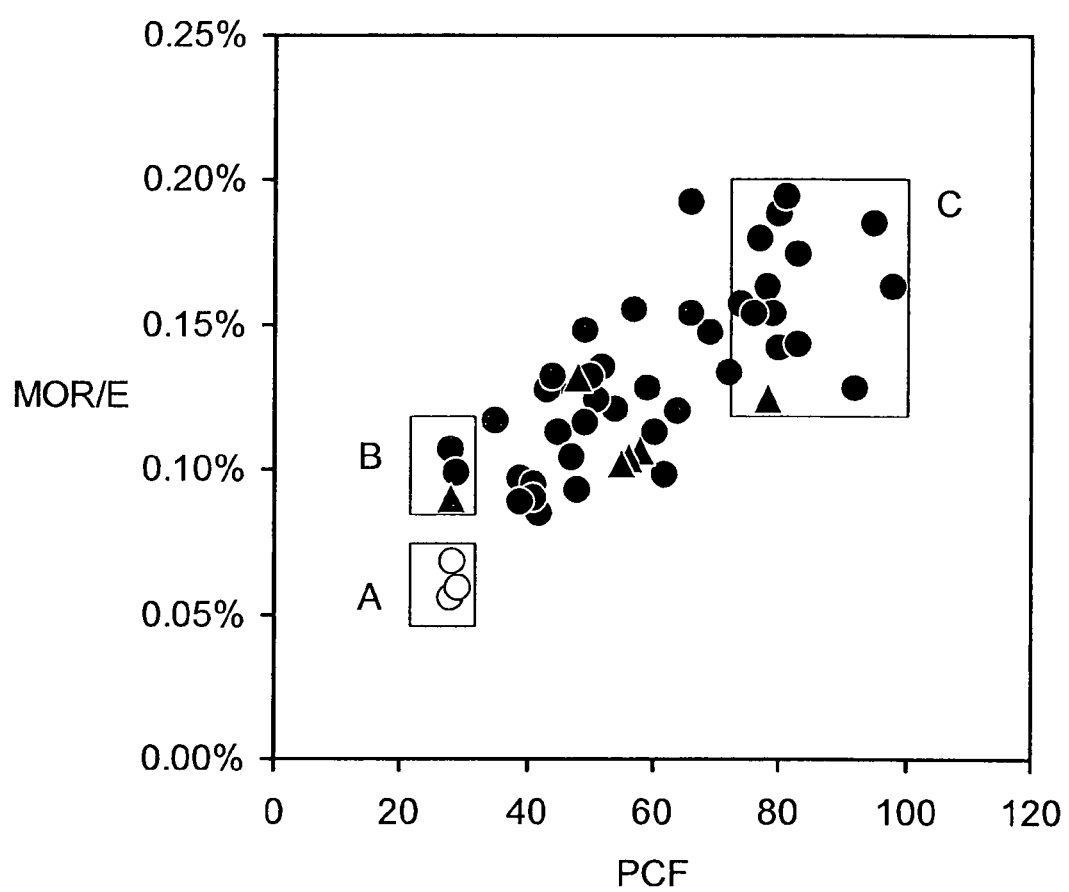
FIG. 5 plots the ratio MOR/E at room temperature versus the pore connectivity factor, PCF (%), for inventive (filled circles and triangles) and comparative (open circles) examples.

A high proportion of well interconnected pores with a narrow pore size distribution of the cordierite honeycomb bodies of the invention may contribute importantly to the high TSP values observed (FIG. 4). High pore interconnectivity in these non-microcracked ceramics has the effect of reducing elastic modulus values to a greater extent than MOR values. Thus, the ratio $MOR_{RT}/E_{RT}$, upon which the TSP value depends, is favorably impacted by the pore morphology of these non-microcracked ceramics (FIG. 5). In accordance with examples of the invention, a relatively high ratio of $MOR_{RT}/E_{RT}$ is provided, wherein $MOR_{RT}/E_{RT} \geq 0.09\%$, $MOR_{RT}/E_{RT} \geq 0.10\%$, $MOR_{RT}/E_{RT} \geq 0.12\%$, $MOR_{RT}/E_{RT} \geq 0.14\%$, or even $MOR_{RT}/E_{RT} \geq 0.16\%$. Certain embodiment exhibit $MOR_{RT}/E_{RT} \geq 0.18\%$ (see examples 27, 37-39, and 41), or even $MOR_{RT}/E_{RT} \geq 0.19\%$ (see examples 37, 41).

As noted above, the relative narrowness of the pore size distribution of the porosity of the porous body of the invention may be characterized by $d_f \leq 0.48$ and/or $d_b \leq 1.65$, wherein $d_f = (d_{50} - d_{10})/d_{50}$ and $d_b = (d_{90} - d_{10})/d_{50}$. The parameters $d_{10}$, $d_{50}$, and $d_{90}$ in these equations are conventionally and defined herein as the pore diameters at which 10%, 50%, and 90%, respectively, of the pore volume of the material resides in pores of smaller pore diameter, as measured by standard mercury porosimetry. Thus, $d_{10} < d_{50} < d_{90}$ in these measurements. For improved TSP performance, values for the porosity d-factor ($d_f$) achieved by embodiments of the invention are $d_f \leq 0.45$, $d_f \leq 0.40$, $d_f \leq 0.37$, $d_f \leq 0.35$, and $d_f \leq 0.30$. Certain embodiments achieve relatively very low porosity d-factor ($d_f$), wherein $d_f \leq 0.28$ (see examples 27, 36, 39, and 44-45), $d_f \leq 0.25$ (see examples 36 and 44-45), or even $d_f \leq 0.23$ (See examples 44-45). Additionally, overall breadth of the pore size distribution as defined as $d_b = (d_{90} - d_{10})/d_{50}$ may also be relatively narrow. For example, values of $d_b$ achievable by embodiment of the invention are $d_b \leq 1.65$, $d_b \leq 1.4$, $d_b \leq 1.20$, $d_b \leq 1.00$, or even $d_b \leq 0.90$. Certain exemplary embodiments exhibit $d_b \leq 0.80$ (see examples 21, 27-28, 30-31, 36, 38-39, 41-42, 44, 46), $d_b \leq 0.70$ (see examples 27-28, 36, 44), or even $d_b \leq 0.65$ (see examples 27 and 44).

Relatively high Pore Connectivity Factors (PCF), defined by the relationship PCF=% porosity/($d_b$), may be achieve by embodiments of the invention. Accordingly, embodiments may achieve PCF$\geq$40%, PCF$\geq$45%, PCF$\geq$50%, PCF$\geq$55%, or even PCF$\geq$60%. Other embodiments exhibit PCF$\geq$70% (see examples 14, 18, 21, 27-28, 30-31, 36, 38-39, 41-44, 46, and 55), PCF$\geq$80% (see examples 27-28, 30, 36, 38, 41-42, and 44), or even PCF$\geq$90% (see examples 27-28 and 44).

In the high-porosity honeycombs according to embodiments of the invention, i.e. cordierite honeycombs having a total porosity (% P) of % P$\geq$46%, the median pore diameter ($d_{50}$) targeted may depend, in part, upon the particular end use for the honeycomb. For use as a flow-through honeycomb substrate for the support of catalysts, the median pore size ($d_{50}$) of a ceramic honeycomb in accordance with the invention may be in the range of about 1-30 µm, with values of $d_{50} \geq 10$ µm, or even 10-30 µm being especially beneficial when the pores are to contain a catalyst material; and values of median pore size ($d_{50}$) of between 1-10 µm being desired when the high porosity $\geq$46%, is required to reduce the thermal mass of the substrate and improve light-off characteristics, for example, such as in non-plugged flow-through catalyst substrate applications.

On the other hand, when the high-porosity honeycomb is to be used as a wall-flow particulate filter, such as in diesel exhaust filtering applications, the median pore diameter ($d_{50}$) may be in the range of 5-15 µm in cases where the filter is to support a low loading of catalyst or is absent a catalyst, and in the range of 15-30 µm where the filter is to support a relatively higher loading of a catalyst. For both of these applications, the total porosities of the walls may be, for example, % P$\geq$46%, % P$\geq$50%, % P$\geq$55%, or even % P$\geq$60%, and in some cases % P$\geq$65%, or even % P$\geq$70%. Many embodiments of the inventive honeycomb structure exhibit the combination of $d_{50} \geq 8$ µm, and a total porosity $\geq$50%.

Figure 6:
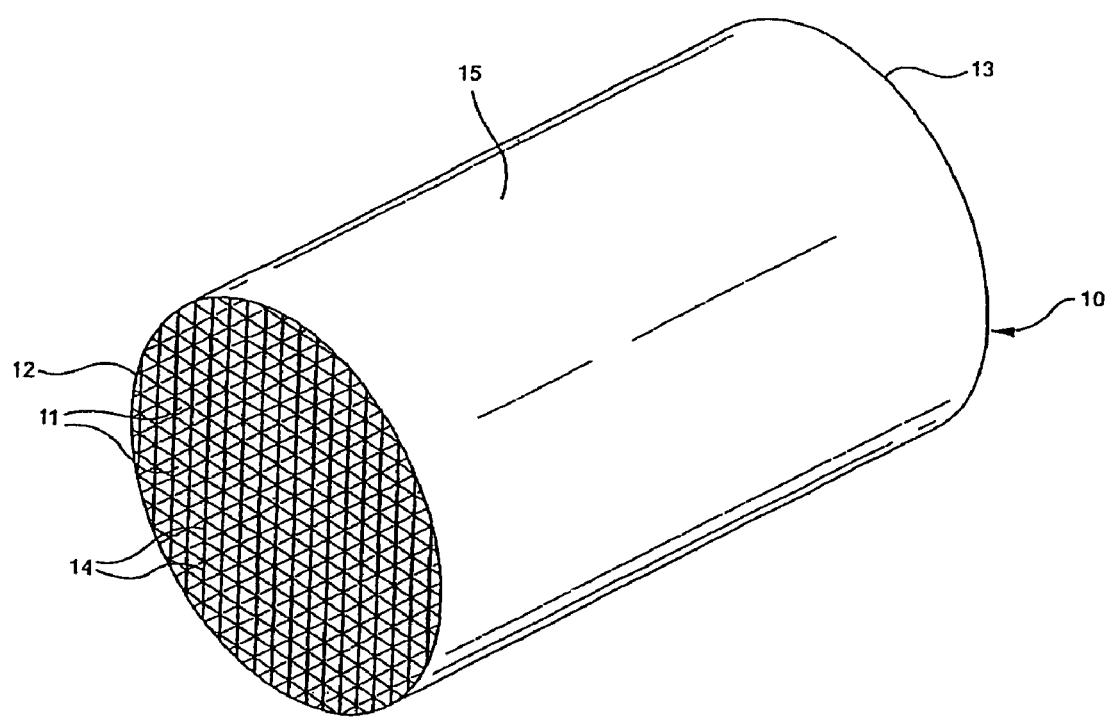
FIG. 6 is isometric view of porous honeycomb substrate according to embodiments of the invention.
Figure 7:
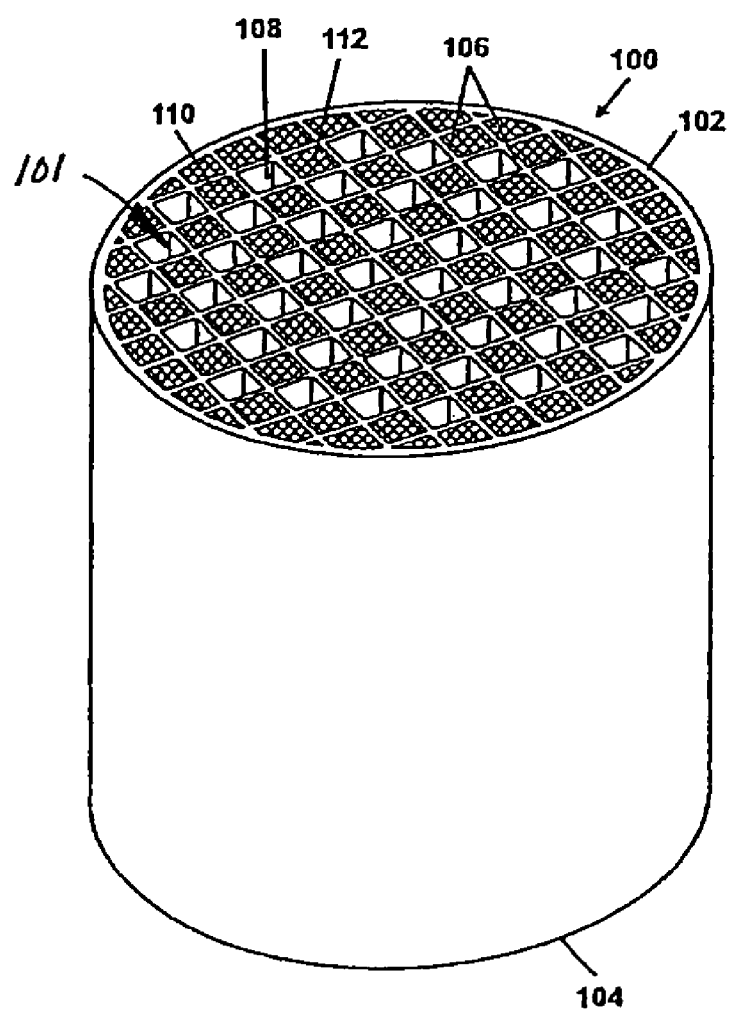
FIG. 7 is isometric view of porous honeycomb filter according to embodiments of the invention.

The ceramic honeycomb bodies may be porous cordierite ceramic honeycomb bodies having a plurality of cell channels extending between a first and second end as shown in FIGS. 6 and 7, for example. The ceramic honeycomb body may have a honeycomb structure that may be suitable for use as, for example, flow-through catalyst substrates or wall-flow exhaust gas particulate filters, such as diesel particulate filters. A typical porous ceramic honeycomb flow-through substrate article 10 according to embodiments of the invention is shown in FIG. 6 and includes a plurality of generally parallel cell channels 11 formed by and at least partially defined by intersecting cell walls 14 (otherwise referred to as "webs") that extend from a first end 12 to a second end 13. The channels 11 are unplugged and flow through them is straight down the channel from first end 12 to second end 13. Preferably, the honeycomb article 10 also includes an extruded smooth skin 15 formed about the honeycomb structure, although this is optional and may be formed in later processing as an after applied skin. By way of explanation and not by limitation, the wall thickness of each cell wall 14 for the substrate may be between about 0.002 to 0.010 inches (about 51 to 253 µm), for example. The cell density may be between 300 and 900 cells per square inch (cpsi), for example. In a preferred implementation, the cellular honeycomb structure consists of multiplicity of parallel cell channels 11 of generally square cross section formed into a honeycomb structure. Alternatively, other cross-sectional configurations may be used in the honeycomb structure as well, including rectangular, round, oblong, triangular, octagonal, hexagonal, or combinations thereof. The term "honeycomb" as used herein is defined as a connected structure of longitudinally-extending cells formed of cell walls, having a generally repeating pattern therein.

FIG. 7 illustrates a honeycomb filter 100 in accordance with another aspect of the invention. The general structure is the same as the flow-through substrate, including a body 101 made of intersecting porous ceramic walls 106 extending from the first end 102 to the second end 104. Certain cells are designated as inlet cells 108 and certain other cells are designated as outlet cells 110. In the filter 100, certain selected channels include plugs 112. Generally, the plugs are arranged at the ends of the channels and in some defined pattern, such as the checkerboard patterns shown. The inlet channels 108 may be plugged at the outlet end 104 and the outlet channels 110 may be plugged at the inlet end 102. Other plugging patterns may be employed and all of the outermost peripheral cells may be plugged (as shown) for additional strength. Alternately, some of the cells may be plugged other than at the ends. In another alternate embodiment, some channels may be flow-through channels and some may be plugged providing a so-called partial filtration design. By way of explanation and not by limitation, the wall thickness of each cell wall 14 for the filter may be between about 0.010 to 0.030 inches (about 253 to 759 µm), for example. The cell density may be between 100 and 400 cells per square inch (cpsi), for example.

The crystalline microstructure of cordierite ceramic honeycomb bodies provided in accordance with the invention may include the low-microcracked feature exhibiting $E_{ratio\ 1000} \leq 1.05$, or even $E_{ratio\ 1000} \leq 1.01$, defined as $E_{ratio\ 1000} = (E_{1000°\ C.}/E_{RT})$), and also may be characterized by either a random orientation of the cordierite crystallites within the honeycombs, or by a net degree of preferred crystallite orientation (having a preferred orientation), most typically with crystallite z-axes having some degree of alignment parallel to the surfaces of the walls of the honeycomb. Random orientations are exemplified by cordierite crystallites in walls of the honeycomb structure exhibiting $\Delta_I \leq 0.1$ wherein $\Delta_I = I_T - I_A$. $I_T$ is the transverse I ratio and $I_A$ is the axial I ratio (see discussion below for definitions). Examples 21-26 exemplify randomly oriented embodiments in accordance with aspects of the invention. On the other hand, cordierite crystallites in walls of the low-microcracked honeycomb structure of the invention which have a preferred orientation exhibit $\Delta_I \geq 0.1$ wherein $\Delta_I = I_T - I_A$ (see examples 1-20 and 27-55). In accordance with embodiments of the present invention porous ceramic honeycomb, the walls of the honeycomb structure including a preferred orientation may further include $I_A \leq 0.6$, $I_A \leq 0.5$, or even $I_A \leq 0.4$. Furthermore, the walls of the honeycomb structure may further include $I_T \geq 0.7$, $I_T \geq 0.8$, $I_T \geq 0.85$, or even $I_T \geq 0.9$. In another aspect, the low-microcracked honeycomb structures of the invention which exhibit preferred orientation may exhibit $\Delta_I \geq 0.2$, $\Delta_I \geq 0.3$, $\Delta_I \geq 0.4$ or even $\Delta_I \geq 0.5$ wherein $\Delta_I = I_T - I_A$.

In order to preserve good thermal shock resistance, the average coefficient of thermal expansion of the cordierite ceramic honeycomb body over the 25° C.-800° C. temperature range (hereinafter the CTE) should be relatively low. Accordingly, CTE $\leq 18.0 \times 10^{-7}$/° C. (25° C.-800° C.) along at least one direction in the ceramic body may be exhibited by embodiments of the invention. In further embodiments, CTE $\leq 16.0 \times 10^{-7}$/° C. (25° C.-800° C.), or even CTE $\leq 14.0 \times 10^{-7}$/° C. (25° C.-800° C.) along at least one direction are provided. In additional embodiments of the low-microcracked honeycombs, the coefficient of thermal expansion of the cordierite ceramic honeycomb body along at least one direction over the temperature range is CTE $\leq 12.0 \times 10^{-7}$/° C. (25° C.-800° C.), CTE $\leq 10.0 \times 10^{-7}$/° C. (25° C.-800° C.), or even CTE $\leq 9.0 \times 10^{-7}$/° C. (25° C.-800° C.). The relatively low level of microcracking of the invention generally provides that $7 \times 10^{-7}$/° C. $\leq$ CTE (25-800° C.) $\leq 15 \times 10^{-7}$/° C. According to some embodiments microcracking provides a honeycomb body wherein $9 \times 10^{-7}$/° C. $\leq$ CTE(25-800° C.) $\leq 15 \times 10^{-7}$/° C., or even $10 \times 10^{-7}$/° C. $\leq$ CTE(25-800° C.) $\leq 15 \times 10^{-7}$/° C. In other embodiments of the invention, the CTE may be such that CTE(25-800° C.) $\geq 0.20(\% P) - 4.5$, or even CTE(25-800° C.) $\geq 0.20(\% P) - 3.0$.

The CTE of a cordierite body is largely determined by the intrinsic CTE of the cordierite crystals, by the overall degree of textural orientation of the cordierite crystals within the ceramic in the direction along which the CTE of the body is measured, by the amount of secondary crystalline phases in the ceramic body, and by the extent of microcracking in the ceramic body. Accordingly, each of these contributions to the CTE of the ceramic honeycomb body along a given direction may be evaluated individually.

It has been discovered that excessive development of secondary crystalline phases such as mullite, spinel, sapphirine, and corundum in these ceramics will raise the CTE to higher values and, thus, should be avoided, if practical. In practice, it has been observed the average CTE increases with the total amount of residual mullite+spinel+sapphirine+corundum present in a predominantly cordierite body by a rate of about $0.6 \times 10^{-7}$/° C. per 1% total of these secondary crystalline phases. Accordingly a "normalized" CTE, corresponding to the component of the thermal expansion coefficient attributable to the cordierite phase only, may be computed as CTE−0.6 (% $2^{nd}$ crystalline phases). Accordingly, to achieve relatively lower CTE, where desirable, these $2^{nd}$ crystalline phases should be present in less than 6% collectively, or even less than 4% collectively.

Figure 8:
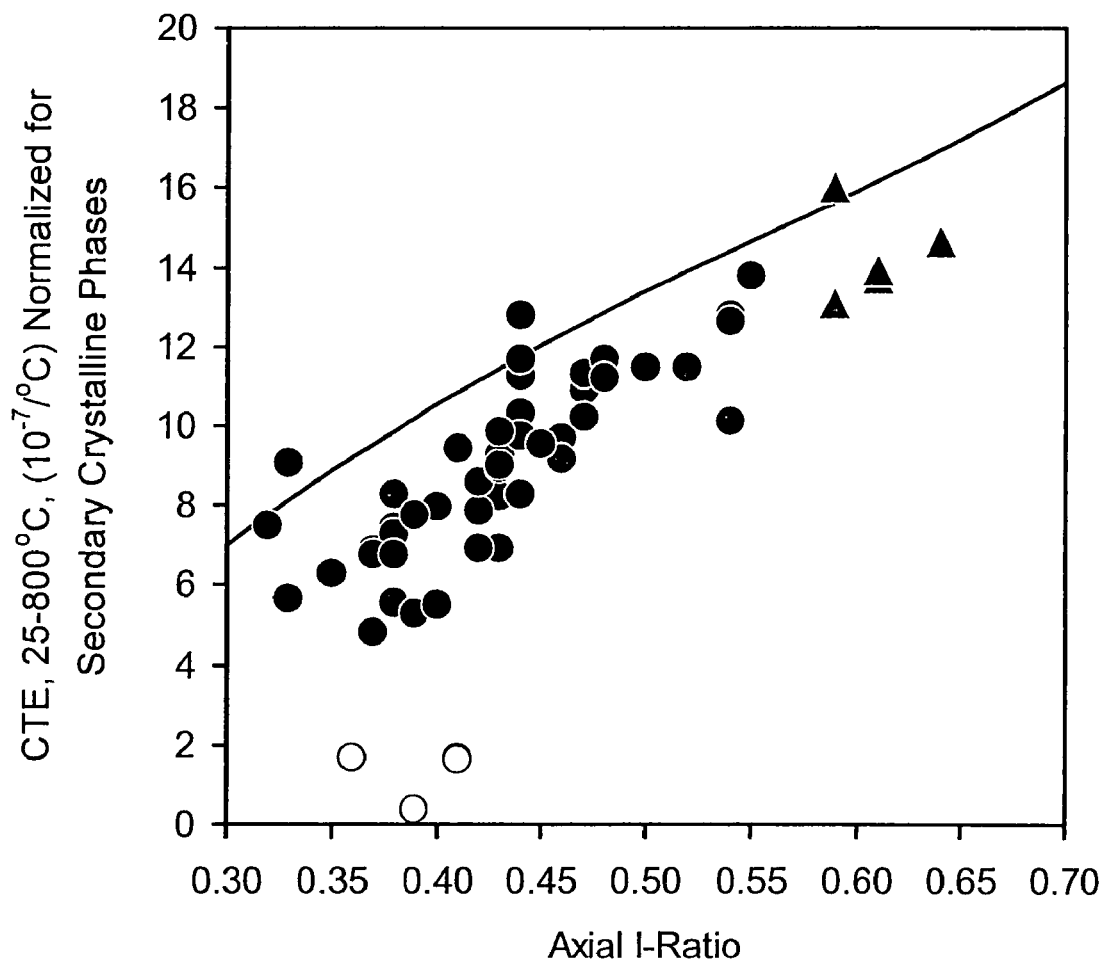
FIG. 8 is a plot of thermal expansion coefficient from 25-800° C., normalized for the presence of secondary crystalline phases by the addition of 0.6 (% Mu+% Sp+% Sa+% Al) to the measured CTE value, versus axial I-ratio for inventive (filled circles and triangles) and comparative (open circles) examples.

It has also been discovered by the inventors that, in the absence of microcracking and secondary phases, the CTE of a cordierite honeycomb body in the direction of the lengths of the channels ("axial" CTE) from 25-800° C. is related to the axial XRD I-ratio, $I_A$, by the relation CTE=$76.8(I_A)^3 - 129.5(I_A)^2 + 97.9(I_A) - 12.8$, wherein the axial I-ratio $I_A = I(110)/[I(110) + I(002)]$ as determined by x-ray diffractometry in accordance with known practice on a cross section orthogonal to the lengths of the channels of the honeycomb (FIG. 8). Another measure of cordierite crystal orientation in the honeycomb body is the transverse I-ratio, $I_T$, which is the peak intensity ratio $I_T = I(110)/[I(110) + I(002)]$ as determined by x-ray diffractometry on the as-fired surfaces of the walls of the honeycomb channels.

It is recognized that excessively low CTEs are generally indicative of excessive microcracking in cordierite honeycombs, which microcracking should be avoided as possibly deleterious to strength and thermal shock resistance (TSR). The degree of microcracking in cordierite honeycomb ceramics, whether or not comprising such secondary crystalline phases, is found to be reflected in a thermal expansion differential factor $\Delta\alpha_{mc}$, defined as:

$$\Delta\alpha_{mc} = [76.8(I_A)^3 - 129.5(I_A)^2 + 97.9(I_A) - 12.8] + 0.6(\% Mu+Sp+Sa+Al) - \text{CTE},$$

wherein % (Mu+Sp+Sa+Al) is the sum of the weight percentages of mullite, spinel, sapphirine, and corundum present in the honeycombs, and wherein $I_A$ is the axial I-ratio as described above. FIG. 8 shows a plot of the CTE normalized for $2^{nd}$ crystalline phase, CTE−0.6(% Mu+Sp+Sa+Al), of inventive and comparative cordierite examples, versus axial I-ratio. The distance to which the normalized CTE lies below the curve for CTE vs. axial I-ratio is equivalent to the value of $\Delta\alpha_{mc}$ for each example.

In accordance with another aspect of the invention, where the cordierite crystallites comprising the honeycomb body are randomly oriented in the walls, such as when exhibiting $\Delta_I \leq 0.1$ wherein $\Delta_I = I_T - I_A$, then CTEs for the honeycombs may be achieved which are less than $18 \times 10^{-7}$/° C. (25° C. to 800° C.), and exemplary embodiments range between $12 \times 10^{-7}$/° C. and $18 \times 10^{-7}$/° C. (25° C. to 800° C.), and with many less than $16 \times 10^{-7}$/° C. (25° C. to 800° C.), or even between $12$-$15 \times 10^{-7}$/° C. (25° C. to 800° C.).

For the purposes of the present description, references to cordierite ceramic bodies or honeycombs are intended to include bodies or honeycombs of similar physical properties comprising "stuffed" cordierites as well. Stuffed cordierites are cordierites having molecules or elements such as $H_2O$, $CO_2$, Li, K, Na, Rb, Cs, Ca, Sr, Ba, Y, or a lanthanide element in the channel site of the cordierite crystal lattice, such constituents imparting modified properties such as improved sinterability or reduced lattice thermal expansion or thermal expansion anisotropy that may be useful for some applications. Also included are cordierites wherein chemical substitutions of Fe, Mn, Co, Ni, Zn, Ga, Ge, or the like for the basic cordierite constituents are made for reasons such as improved sinterability, color, electrical properties, or catalytic properties.

In another broad aspect, the invention includes a method for making the porous cordierite ceramic honeycomb structure such as hereinabove described. In accordance with that method, inorganic raw material sources of MgO, $Al_2O_3$, $SiO_2$ or combinations thereof are combined with an organic binder, a liquid vehicle and one or more optional constituents including pore-forming agents, plasticizers, and lubricants to form a plasticized batch. The plasticized batch is then formed by shaping, such as by extrusion, into a green honeycomb. These green honeycombs are then dried, such as by microwave or RF drying, and fired in a kiln to sinter or reaction-sinter the inorganic raw material sources into unitary cordierite ceramic honeycomb bodies. The green bodies are fired for a time and at a temperature sufficient to provide a sintered cordierite honeycomb including relatively low microcracking and relatively high thermal shock as exhibited by achieving $E_{Ratio} \leq 1.05$ and TSP$\geq$525 psi.

Inorganic ingredients suitable for use as raw materials for compounding such plasticized batches include natural or synthesized cordierite powders, as well as inorganic powders or combinations of inorganic powders capable of reacting to form non-microcracked cordierite bodies through high-temperature reactions. Examples include (1) cordierite powders, also called "grogs," consisting predominantly of a cordierite phase ceramic; (2) magnesium aluminosilicate-based glass powders, also called frits; (3) powders wherein each particle comprises an assemblage of multiple phases that will react to form a cordierite; (4) mixtures of two or more compositionally different powders, each of which may be single-phase or multi-phase powder; and (5) chemically precipitated magnesium aluminosilicate powders such as sol-gel powders that will react to form a cordierite microstructure.

The median particle diameter of the powders is not critical; particle sizes may be routinely adjusted to those diameters effective to provide a median pore size in the final body that is suitable for the particular application. For example, when the application is a catalytic converter substrate, the median particle size of the raw materials may be between 2 and 20 microns. When the application is a diesel particulate filter, the median particle size may be between 15 and 50 microns. However, it is normally preferred that the particle size distribution of the inorganic powder or inorganic powder combinations be made narrow so as to preferably provide a narrow pore size distribution, high pore connectivity, and a high MOR/E ratio in the fired body.

The bulk composition of the raw materials present in the starting powders, exclusive of volatile components such as $H_2O$, $CO_2$, $SO_2$, and organics, should be adjusted to provide a net oxide composition of approximately 48-54% $SiO_2$, 33-37% $Al_2O_3$, and 11-16% MgO, with the cumulative weights of these three oxides constituting at least 95% of the total weight of batch exclusive of volatile or evaporable components. Preferably, the ratios of these oxides will be adjusted so that the fired ceramic bodies will constitute at least 90% by weight of cordierite, or even 95% or 97% by weight of cordierite.

Other components that may be present in these batches in minor proportions include oxides of impurity elements or intentional dopants such as calcium, iron, titanium, sodium, potassium, boron, tungsten, bismuth, etc. The ratio of magnesia, alumina, and silica components in the bulk raw material mixture may be chosen to form only stoichiometric cordierite, or may be selected to allow the formation of some spinel, sapphirine, mullite, forsterite, enstatite, or a glass phase. However, the sum of $CaO+Na_2O+K_2O$ may be less than 1.0 wt. %, or even less than 0.5 wt %, and cristobalite development in the body should be limited to less than 1.0 wt %, or more preferably entirely avoided.

When synthesized cordierite powders are selected for use in the batch, the cordierite particles, when coarser than about 20 microns, are preferably not single-crystal particles, but preferably comprise a polycrystalline aggregate of cordierite crystallites. The cordierite crystallites may be randomly oriented with respect to adjacent crystallites within the particles. If the cordierite raw material particles comprises, entirely, or in part, "domains" of crystallites sharing a near-parallel orientation with respect to one another within a domain, then these domains are should not larger than about 20 microns, and in some cases not larger than 10 μm.

Cordierite powders suitable for the intended purpose can be obtained, for example, by the complete or partial pre-reaction of inorganic precursor materials, including mineral combinations such as clay+talc+alumina, spinel+silica, magnesia+alumina+silica, forsterite+kaolin, etc., or by the partial or complete devitrification (crystallization) of a magnesium alumino-silicate glass frit; or by the partial or complete crystallization of a chemically precipitated magnesium aluminosilicate material, such as a sol-gel powder. Alternatively naturally occurring cordierites, ground to suitable particle sizes, can be used.

When the cordierite powder is prepared by reacting inorganic mineral raw materials or chemically precipitated materials, it may be formed, for example, by fabricating a mass of the mixed precursors or chemical precipitates, heating the mass to a temperature sufficient to form cordierite, and then crushing the mass to the desired particle size with optional sieving or air classification. Alternatively, the raw materials or precipitates could also be pre-powdered by spheroidizing, such as by spray drying or other atomization method, and the resulting granules heated to temperatures effective to form cordierite. When the cordierite powder is prepared from a glass precursor, the molten glass may be formed into a convenient shape and crushed, or it may be "drigaged" by pouring the molten glass into a quenching liquid such as water. The resulting glass feeds may then be ground to a desired particle size with optional sieving or air classification to select an appropriately necessary particle size range.

When the final particle size of the glass is to be larger than about 20 μm, the glass may contain a nucleating agent, such as titanium oxide, to promote the nucleation of cordierite at many locations throughout the interior of the glass particle during subsequent devitrification to prevent formation of crystal domains larger than 20 μm. The glass powder is then heated so as to nucleate and grow cordierite by devitrification, or "ceramming." Optionally, the devitrified glass may be subjected to additional powder processing after heating to obtain the desired particle size distribution.

In accordance with a preferred batch method, the mixture of inorganic raw materials includes talc, an alumina-forming source, a silica-forming source, and, optionally, kaolin or calcined kaolin. In particular embodiments, the raw material mixture may further include a colloidal metal oxide source. The colloidal metal oxide source is capable of forming a colloidal suspension in a solvent preferably and contains 0 to 97 wt % $SiO_2$, 0 to 97% MgO, 0 to 97% $Al_2O_3$, and at least 3.0 wt. % of one or more metal oxides selected from the group comprising $Li_2O$, $Na_2O$, $K_2O$, CaO, $Fe_2O_3$, and $TiO_2$. The metal oxides may further comprise at least 4%, at least 5%, or even at least 6 wt. % of the colloidal metal oxide source. According to embodiments, the colloidal metal oxide source may comprise a colloidal silicate phase containing at least 50 wt % $SiO_2$ when the chemical formula is calculated on an anhydrous basis. For example, the colloidal silicate may be a colloidal phyllosilicate, such as an attapulgite or bentonite clay. According to further embodiments, the mixture of inorganic raw materials may contain a nucleating agent for promoting the nucleation of cordierite by reaction of the inorganic raw materials. One useful nucleating agent is a pre-reacted cordierite powder.

In addition to the mixture of inorganic raw materials, the batch may further include a pore-forming agent. The pore-forming agent may comprise greater than or equal to 50% by weight, or even 60% by weight, of the inorganic raw materials by superaddition. The pore-forming agents may comprise combinations of graphite and starch, for example. The starch may comprise corn or potato starch. In the case where a combination of graphite and starch is employed, the pore-forming agents may comprise greater than or equal to 40% graphite and greater than or equal to 10% starch, as a superaddition based upon 100% weight of the inorganic raw materials.

Figure 9:
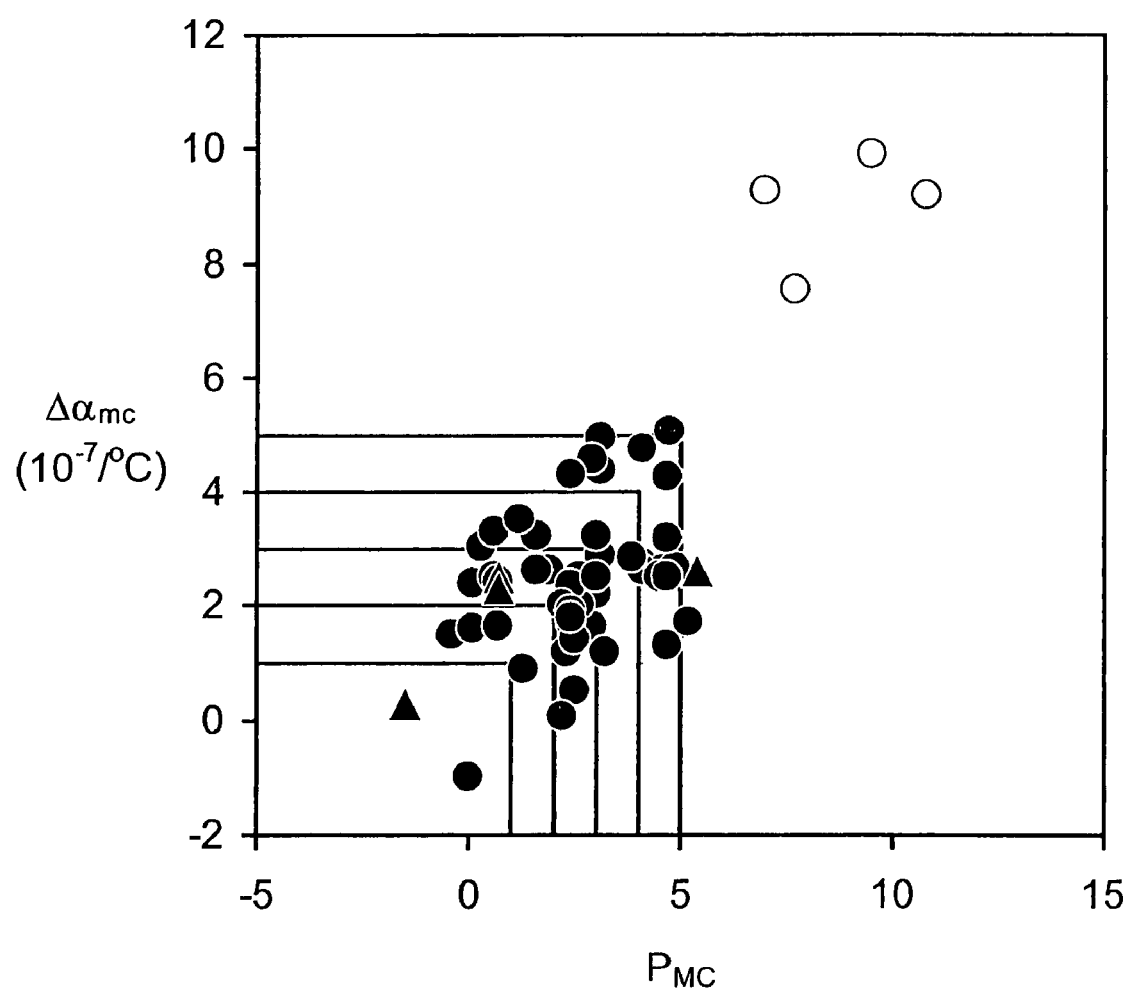
FIG. 9 is a plot of the relationship between $\Delta\alpha_{mc}$ and the parameter $P_{MC}$ for inventive (filled circles and triangles) and comparative (open circles) examples.
Figure 10:
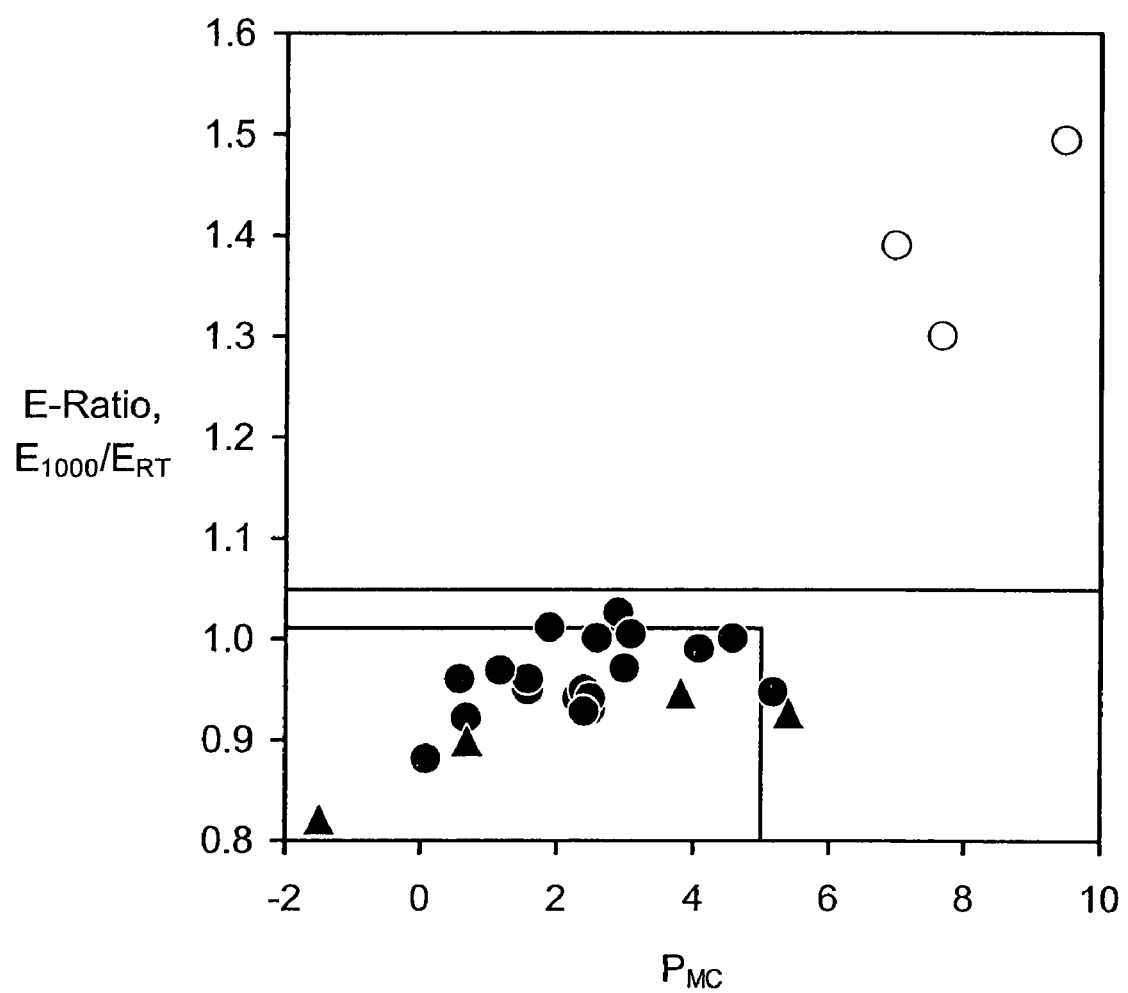
FIG. 10 is a plot of the relationship between $E_{Ratio} = E_{1000° C.}/E_{RT}$ and the parameter $P_{MC}$ for inventive (filled circles and triangles) and comparative (open circles) examples.
Figure 11:
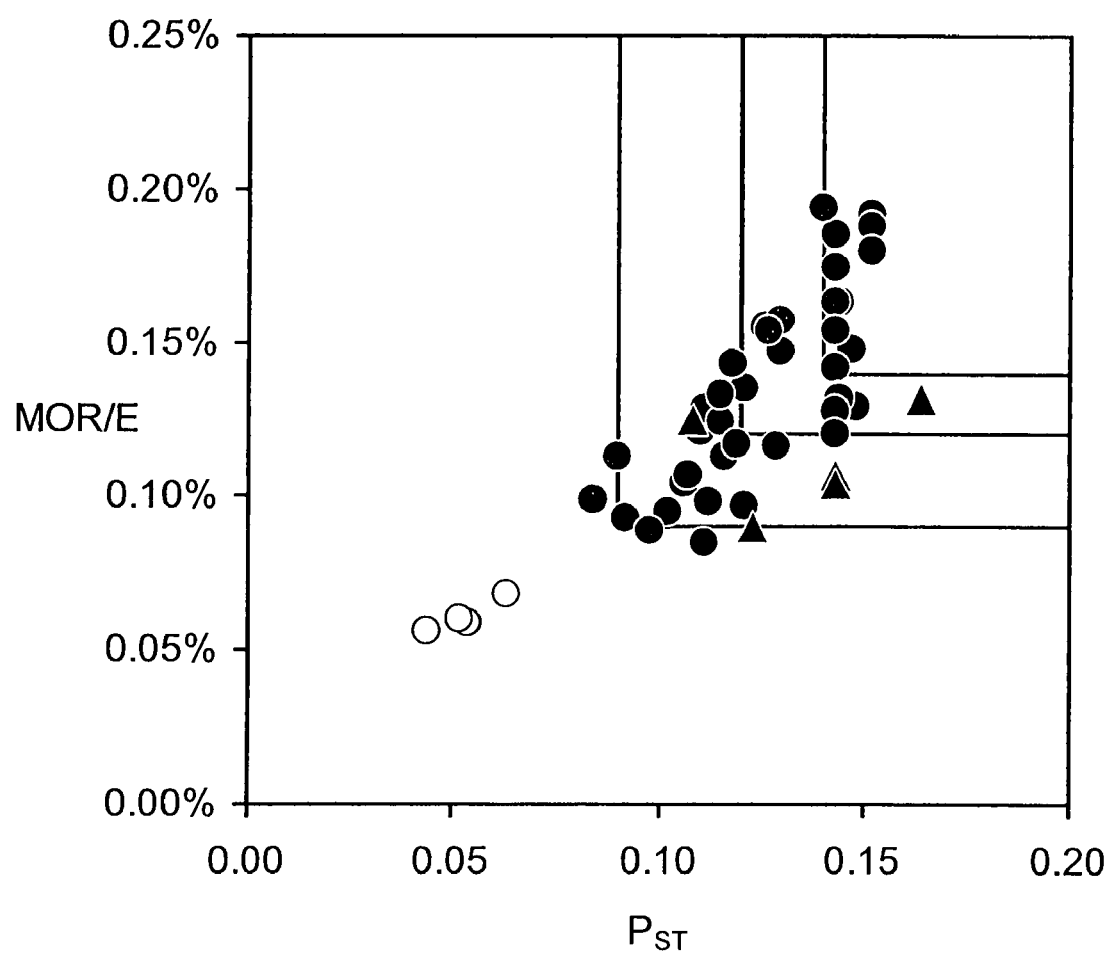
FIG. 11 is a plot of the relationship between MOR/E and the parameter $P_{ST}$ for inventive (filled circles and triangles) and comparative (open circles) examples.

According to embodiments of the method, to produce ceramic honeycomb articles exhibiting low microcracking as well as high strain tolerance (MOR/E), and, therefore, high TSP, certain components of the batch should be appropriately selected, in particular, the raw inorganic raw materials and the pore former, and the firing conditions should be appropriately controlled. It has been discovered that achieving a factor $P_{MC} \leq 5.0$ tends to yield very low microcracking (FIGS. 9 and 10), while achieving a factor of $P_{ST} \geq 0.090$ tends to yield high strain tolerance (MOR/E), and thus achieves high TSP in the honeycomb article (FIG. 11). $P_{MC}$ and $P_{ST}$ are defined as:

$P_{MC}$=7.06+0.164 (wt % raw kaolin)+0.095 (wt % calcined kaolin)−0.00870 (wt % alumina-forming sources)($d_{50}$ of alumina-forming sources)-0.0657 (wt % pore formers)+0.022 (heating rate from 800° C. to 900° C.)+0.025 (heating rate from 1200° C. to 1300° C.)−0.018 (heating rate from 1350° C.-$T_{max}$)−0.462 (wt % colloidal metal oxide source), and $P_{ST}$=0.067+0.000967 (wt % pore former)−0.00000516 (wt % pore former)($d_{50}$ of pore former)−0.000921 (wt % kaolin+wt % calcined kaolin)+ 0.0000502 (wt % alumina-forming sources)($d_{50}$ of alumina-forming sources)−0.0000143 (wt % talc)($d_{50}$ of talc)+0.00392 (wt % colloidal metal oxide source).

To achieve relatively lower microcracking, $P_{MC} \leq 3.0$, $P_{MC} \leq 2.0$, or even $P_{MC} \leq 1.0$ may be provided. Similarly, to achieve relatively higher strain tolerance (MOR/E) and thus relatively higher TSP, then $P_{ST} \geq 0.100$, $P_{ST} \geq 0.120$, or even $P_{ST} \geq 0.140$. In order to achieve relatively lower CTE (25° C.-800° C.), the raw material mixture may be absent of pre-reacted cordierite or other cordierite nucleating agent.

In additional embodiments, the method may include inorganic raw materials which are absent of kaolin or calcined kaolin. Lack of kaolin or calcined kaolin may provide a lesser degree of microcracking, and may also narrow the pore size distribution. Similarly, the raw material mixture may be absent of an aluminum trihydrate [gibbsite or Al(OH)$_3$] having a median particle diameter smaller than 4 microns, as a lack of fine aluminum trihydrate may also provide a lesser degree of microcracking. Additionally, the raw material mixture may be absent of kaolin or calcined kaolin and further comprise a talc source, one or more alumina-forming sources, a silica-forming source, at least 20 wt % pore former, and 0-10 wt % of a colloidal phyllosilicate which contains at least 4 wt % ($Li_2O+Na_2O+K_2O+CaO+Fe_2O_3+TiO_2$). The presence of colloidal phyllosilicate may help introduce impurities and, therefore, may help produce more of a glassy phase which may generally reduce microcracking. According to further embodiments of the invention, the talc source and the silica-forming source may each be relatively fine and may have a median particle diameter of less than 12 µm, the colloidal phyllosilicate may constitute at least 3 wt. %, and the pore former may have a median particle diameter of not more than 40 µm. According to other embodiments, the talc source and the silica-forming source each have a median particle diameter of at least 12 µm and not more than 35 µm, and each pore former possesses a median particle diameter of not less than 30 µm and not greater than 60 µm.

Examples of cordierite ceramics both inside (Inventive) and outside (Comparative, designated with a C) of the scope of the present invention are set forth in Tables 1-18 below. These include materials with varying porosities, pore size distributions, degrees of pore connectivity (via varying PCF), as well as material strength (MOR) and thermal properties (CTE, etc.). Included in Table 1 is a list of the various raw materials that may be used in the batches formulating these inventive porous ceramic honeycombs. The batch compositions for the various examples of the present invention are provided in Tables 3-9. All particle sizes listed for the raw materials are obtained by laser diffractometry such as on a Model FRA9200 or Model S3000 Microtrac particle analyzer (products of Microtrac Inc.) unless noted otherwise. Included in Tables 11-18 are relevant physical properties for exemplary embodiments of the low-microcracked cordierite ceramics honeycomb products of the invention, both as measured and as calculated from the measured values. Properties of the comparative examples are provided in Table 10. These values include the % Porosity (% P) of each material by volume, various pore diameters (e.g., $d_1$, $d_{10}$, $d_{50}$, $d_{90}$, etc.) of the materials, the porosity d-factor ($d_f$) defined as $d_f=(d_{50}-d_{10})/d_{50}$, the porosity breadth factor ($d_b$) defined as $d_b=(d_{90}-d_{10})/d_{50}$, the pore connectivity factor (PCF), defined as PCF=% P/($d_b$), various measures of Coefficient of Thermal Expansion (CTE) of the honeycombs over various ranges (25-800° C., 500-900° C., and 200-1000° C.), the thermal expansion differential factor attributable to microcracking ($\Delta\alpha_{mc}$), the transverse I-ratios ($I_T$) and axial I-ratios ($I_A$) determined in individual cases on extruded honeycomb shapes of the materials, as well as the I ratio difference ($\Delta I$), defined as $\Delta I=I_T-I_A$, the percents of secondary crystal phases mullite, spinel+sapphirine, and alumina present in the material (the remaining percentage made up of cordierite phase and intercrystalline glass), the cell densities (in cpsi or cells/in$^2$ of the honeycomb taken in cross-section) and wall thicknesses (in mils or thousandths of inches) of sample cellular honeycomb ceramics made of the materials, the Closed Frontal Area (CFA), the room temperature modulus of rupture strength (MOR), the ratio of room temperature modulus of rupture strength to Closed Frontal Area (MOR/CFA), the elastic modulus of each material (psi) at various temperatures during heating (@ RT (25° C.), @900° C. and 1000° C.) as determined on a honeycomb ceramic sample of that material, the $E_{ratio}$ at various temperatures (@900° C. and @1000° C.), the microcrack parameter Nb$^3$ (as defined below), the room temperature (at 25° C.) strain tolerance (MOR/E), thermal shock parameter (TSP), and thermal shock limit (TSL) of the materials, wherein TSP is defined as TSP=$MOR_{RT}/[E_{RT}][CTE_H]$, wherein ($E_{RT}$) is the room temperature elastic modulus, ($MOR_{RT}$) is the room temperature modulus of rupture strength, and ($CTE_H$) is the high temperature (500-900° C.) thermal expansion coefficient. TSL is defined as TSL=TSP+ 500° C. Also computed is a thermal shock parameter based upon a near-skin temperature of 200° C., TSP*=$MOR_{RT}/[E_{RT}][CTE_{200\text{-}1000° C.}]$, and the corresponding thermal shock limit TSL*=TSP*+200° C., which the estimated temperature to which the core of the honeycomb may be heated without fracture when the skin is at 200° C.

The microcracked parameter Nb$^3$ is a measure of the level of microcracking in ceramic bodies, such as a cordierite ceramics. The present inventors have discovered that for a low-microcracked cordierite body, the elastic modulus gradually decreases with increasing temperature. This decrease in the elastic modulus is believed to be attributable to the increasing distance between atoms within the crystal structure with increasing temperature. An example of the decrease in elastic modulus with increasing temperature for a porous, non-microcracked cordierite honeycomb body is depicted in FIG. 1. FIG. 1 shows the elastic modulus versus temperature behavior for a non-microcracked cordierite honeycomb ceramic (inventive example 42) during heating to 1,200° C. (filled circles) and cooling back to room temperature (open squares). The near overlap of the heating and cooling trend lines signifies a virtual absence of microcracks. The elastic modulus decrease has been found to be essentially linear from room temperature to 900° C., or even to 1000° C. Above about 1,000° C., there is a greater rate of decrease in elastic modulus with increasing temperature. This is believed to be due to the softening, or even partial melting, of a small amount of residual glass phase that originally formed by reaction of impurities during sintering of the ceramic. Surprisingly, the rate of change in the elastic modulus with heating for a non-microcracked cordierite ceramic, $\Delta E°/\Delta T$, was found to be proportional to the value of the elastic modulus of the non-microcracked body at room temperature, $E°_{RT}$, and is closely approximated by the relation of EQ. 1:

$$\Delta E°/\Delta T = -7.5 \times 10^{-5}(E°_{RT}) \qquad \text{EQ. 1}$$

The superscript "°" elastic modulus term (EO) denotes the elastic modulus of the ceramic in a non-microcracked state. Based upon EQ. 1, one can calculate the ratio of the elastic modulus of a non-microcracked cordierite body at 900° C. or at 1000° C. to that of a non-microcracked cordierite body at 25° C. as being $E_{900° C.}/E_{RT} = 1 + 875(-7.5 \times 10^{-5}) = 0.934$ or $E_{1000° C.}/E_{RT} = 1 + 975(-7.5 \times 10^{-5}) = 0.927$. These values of $E°_{900° C.}/E°_{RT}$ and $E°_{1000° C.}/E°_{RT}$ provide a baseline against which to compare the $E_{900° C.}/E_{RT}$ and $E°_{1000° C.}/E°_{RT}$ values of a microcracked ceramic body. For non-microcracked cordierite bodies, the temperature dependence of the elastic modulus during cooling after heating to a high temperature, such as 1,200° C., is essentially identical to the temperature dependence during the original heating, so that, at any given temperature, the value of the elastic modulus during cooling is nearly the same as its value at that temperature during heating. This is also illustrated in FIG. 1 for a low-microcracked cordierite ceramic.

An example of the temperature dependence of the elastic modulus for a highly microcracked cordierite ceramic body is displayed in FIG. 2. Thus, FIG. 2 shows the elastic modulus versus temperature behavior for a microcracked cordierite honeycomb ceramic (comparative example C4) during heating to 1,200° C. (filled circles) and cooling back to room temperature (open squares). Line A-B represents a tangent to the elastic modulus cooling curve at point C (open triangle) where the slope of the curve is equal to $-7.5 \times 10^{-5}(E°_{RT})$, and $E°_{RT}$ is the value of the tangent line at room temperature.

The elastic modulus increases gradually, and then more steeply, with increasing temperature up to 1,200° C. This increase is believed to be due to the re-closing, and eventual annealing, of the microcracks with heating, so that the ceramic body has progressively fewer open microcracks at higher temperatures. The increase in E due to the reduction in microcracking more than offsets the decrease in E of the individual cordierite crystallites with heating, resulting in a more rigid body at high temperature. As the ceramic is cooled from 1,200° C., the microcracks do not immediately re-open, because micro-stresses are initially too low. As a result, the trend in elastic modulus with cooling is initially that of a non-microcracked cordierite body. The increase is steep at first due to the increase in viscosity of any liquid or glass phase, possibly accompanied by a reduction in volume fraction of the liquid or glass due to crystallization or devitrification, respectively. Between about 1,000 and 800° C. in the example in FIG. 2, the more gradual increase in E with decreasing temperature can be ascribed to the natural increase in the elastic modulus of the cordierite crystals with cooling. At temperatures below about 800° C., the elastic modulus undergoes a gradual, then more rapid, decrease with cooling. This is due to the progressive re-opening of the microcracks and a decrease in the rigidity of the ceramic. At room temperature, the elastic modulus has returned to a value close to the initial value of the ceramic before the thermal cycle to 1,200° C.

The extent of microcracking in the cordierite ceramic is reflected in two features of the elastic modulus heating and cooling curves. One manifestation of the degree of microcracking is the extent to which the elastic modulus increases from 25° C. to 900° C. or to 1000° C. during heating, as this increase is believed to be caused by a re-closing of the microcracks. For example, in FIG. 2, the ratio of $E_{1000° C.}/E_{RT}$ for the heating curve is 1.49. This value is much higher than the value of 0.927 that would be expected in the complete absence of microcracking. Thus, the value of $E_{1000° C.}/E_{RT}$ for a cordierite ceramic may be utilized as a quantitative measure of the extent of microcracking in the room-temperature body.

Another indication of the degree of microcracking is the gap between the elastic modulus heating and cooling curves. A method to quantify this hysteresis is based upon the construction of a tangent to the cooling curve in a temperature region where the sample is still in a non-microcracked state. In FIG. 2, such a tangent is shown as line A-B, and the point of tangency is denoted by point "C". The slope of the tangent line is, therefore, equivalent to the temperature dependence of the elastic modulus of the non-microcracked cordierite body, as constrained by EQ. 1. Furthermore, the value of this tangent line extrapolated back to room temperature (point A) is approximately equivalent to the room-temperature elastic modulus of the sample if it were not microcracked at room temperature, and is equal to $E°_{RT}$ for that sample. Thus, the equation of the tangent line is given by the following general expression:

$$E°_{tangent} = (E°_{RT})\{1 - 7.5 \times 10^{-5}(T-25)\} \qquad \text{EQ. 2}$$

In practice, the inventors have devised an analytical method for determining $E°_{RT}$ from the experimental measurements of the elastic modulus during cooling, after heating to about 1,200° C. In accordance with this method, a second-order polynomial is fit to the elastic modulus measurements made during cooling between about 1,000° C. and 500° C., as a function of temperature (° C.). This equation is of the following form:

$$E = c + b(T) + a(T^2) \qquad \text{EQ. 3}$$

In practice, the upper limit of the temperature range over which the experimentally measured elastic modulus values are fit by EQ. 3 may be further restricted to a temperature less than 1000° C. if it is determined that the trend in E versus temperature exhibits a very high curvature at, or below, about 1000° C., due to, for example, softening of a glass phase or formation of a small amount of liquid. Likewise, the lower limit of the temperature range over which the experimentally measured elastic modulus values are fit by EQ. 3 may be further restricted to a temperature greater than 500° C. if it is determined that the trend in E versus temperature exhibits a very high curvature at, or above, about 500° C., due to, for example, reopening of the microcracks. The method of least-squares regression analysis is used to derive the values of the regression coefficients "a," "b," and "c" in EQ. 3.

The value of $E°_{RT}$ is obtained by solving for the elastic modulus and temperature at which the tangent line, given by EQ. 2, intersects the polynomial curve fit to the elastic modulus data during cooling, given by EQ. 3. The values of the elastic modulus and temperature at this point of intersection are denoted $E_i$ and $T_i$, respectively. In the example in FIG. 2, the values of $E_i$ and $T_i$ correspond to the triangle, point C. Because this point of intersection is common to both the tangent line and the polynomial curve, it follows that $$E_i = (E°_{RT})\{1 - 7.5 \times 10^{-5}(T_i - 25)\} = c + b(T_i) + a(T_i^2) \quad \text{EQ. 4}$$

Also, at the point of tangency, the slope of the polynomial curve must equal that of the tangent line. Therefore, it follows that $$(E°_{RT})(-7.5 \times 10^{-5}) = b + 2a(T_i) \quad \text{EQ. 5}$$

EQ. 4 and EQ. 5 provide two equations relating the two unknown quantities, $E°_{RT}$ and $T_i$, to one another. To solve for $E°_{RT}$ and $T_i$, EQ. 5 is first rearranged to yield $$(E°_{RT}) = \{b + 2a(T_i)\}/(-7.5 \times 10^{-5}) \quad \text{EQ. 6}$$

EQ. 6 is then substituted into EQ. 5 to give the following expression:

$$\{\{b + 2a(T_i)\}/(-7.5 \times 10^{-5})\}\{1 - 7.5 \times 10^{-5}(T_i - 25)\} = c + b(T_i) + a(T_i^2) \quad \text{EQ. 7}$$

EQ. 7 may be rearranged to yield the following:

$$0 = \{c + b(T_i) + a(T_i^2)\} - \{\{b + 2a(T_i)\}/(-7.5 \times 10^{-5})\}\{1 - 7.5 \times 10^{-5}(T_i - 25)\} \quad \text{EQ. 8}$$

Gathering terms in EQ. 8 gives the following relation:

$$0 = \{c - \{b/(-7.5 \times 10^{-5})\}\{1 + 7.5 \times 10^{-5}(25)\}\} + \\ (T_i)(b) - (T_i)\{2a/(-7.5 \times 10^{-5})\}\{1 + 7.5 \times 10^{-5}(25)\} - \\ (T_i)\{\{b/(-7.5 \times 10^{-5})\}\{-7.5 \times 10^{-5}\}\} + \\ (T_i^2)\{a - \{2a/(-7.5 \times 10^{-5})\}(-7.5 \times 10^{-5})\} \quad \text{EQ. 9}$$

Further simplifying EQ. 9 yields $$0 = \{c - \{b/(-7.5 \times 10^{-5})\}\{1 + 7.5 \times 10^{-5}(25)\}\} + \\ (T_i)\{-2a/(-7.5 \times 10^{-5})\}\{1 + 7.5 \times 10^{-5}(25)\} + (T_i^2)(-a) \quad \text{EQ. 10}$$

EQ. 10 may be re-expressed as $$0 = C + B(T_i) + A(T_i^2) \quad \text{EQ. 11}$$

where $C = \{c - \{b/(-7.5 \times 10^{-5})\}\{1 + 7.5 \times 10^{-5}(25)\}\}$, $B = \{-2a/(-7.5 \times 10^{-5})\}\{1 + 7.5 \times 10^{-5}(25)\}$, and $A = -a$. The value of $T_i$ can then be found by solving the quadratic formula:

$$T_i = \{-B + \{B^2 - 4(A)(C)\}^{0.5}\}/2A \quad \text{EQ. 12}$$

$$T_i = \{-B - \{B^2 - 4(A)(C)\}^{0.5}\}/2A \quad \text{EQ. 13}$$

EQ. 12 and EQ. 13 provide two possible values of $T_i$, of which only one will have a physically realistic value, that is, a value lying between 25 and 1,200° C. The physically realistic value of $T_i$ computed in this manner is then substituted into EQ. 6, from which the value of $E°_{RT}$ is calculated.

Once $E°_{RT}$ has been solved for, the ratio of the elastic modulus for the hypothetically non-microcracked sample at 25° C., $E°_{RT}$, to the actual measured value of the elastic modulus of the microcracked sample at 25° C., $E_{RT}$, is proportional to the degree of microcracking in the initial sample before heating. That is, a greater degree of microcracking at room temperature will lower the value of $E_{RT}$, and thereby raise the value of $E°_{RT}/E_{RT}$.

Modeling of the relationship between elastic modulus and microcracking has provided a relationship between the ratio $E°_{RT}/E_{RT}$ and the quantity $Nb^3$, where N is the number of microcracks per unit volume of ceramic and b is the diameter of the microcracks (see D. P. H. Hasselman and J. P. Singh, "*Analysis of the Thermal Stress Resistance of Microcracked Brittle Ceramics,*" Am. Ceram. Soc. Bull., 58 (9) 856-60 (1979).) Specifically, this relationship may be expressed by the following equation:

$$Nb^3 = (9/16)\{(E°_{RT}/E_{RT}) - 1\} \quad \text{EQ. 14}$$

Figure 12:
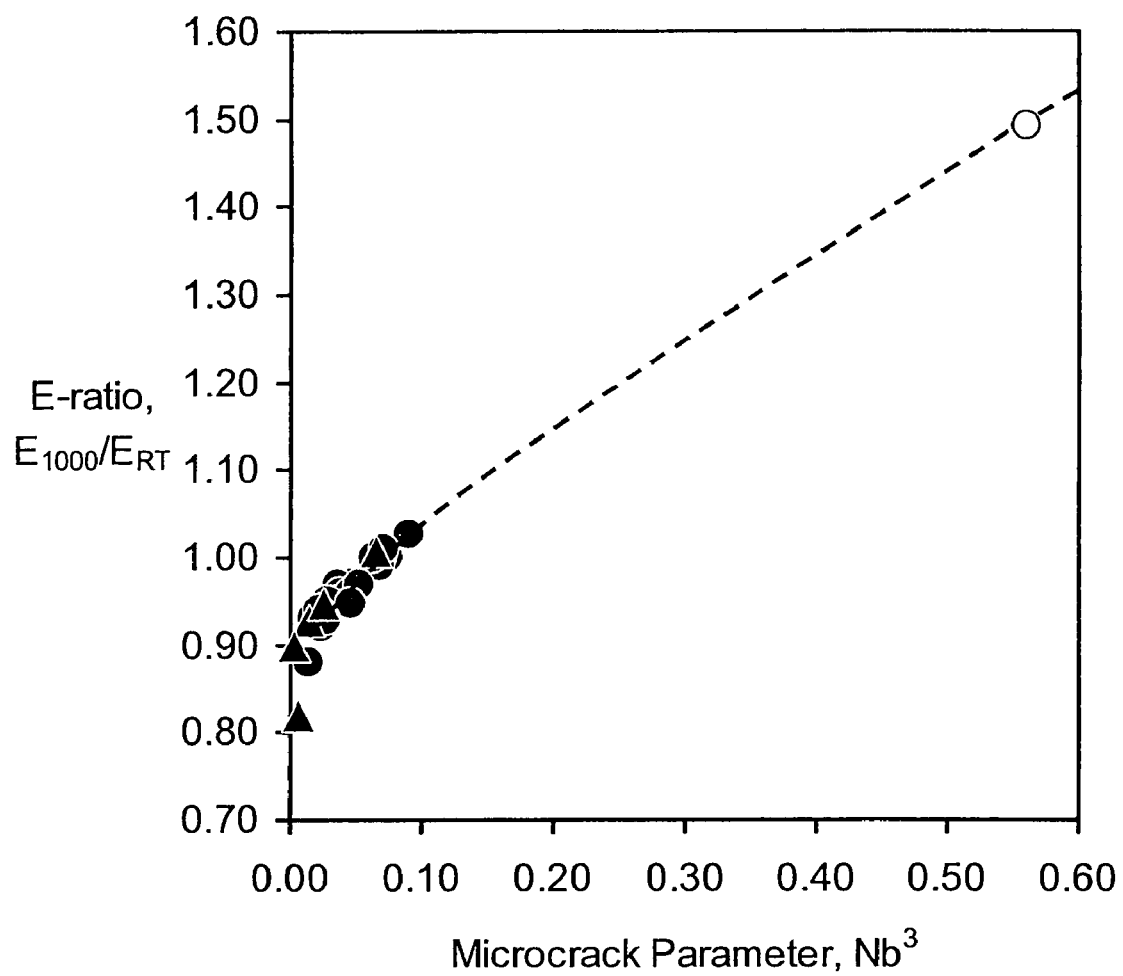
FIG. 12 is a plot of the relationship between the $E_{Ratio\ 1000° C.}$ and the microcrack parameter, $Nb^3$ for inventive (filled circles and triangles) and comparative (open circles) examples.

Although based upon a number of simplifying assumptions, the quantity $Nb^3$, referred to herein as the "Microcrack Parameter," provides another useful means to quantify the degree of microcracking in a ceramic body. For a non-microcracked body, the value of $Nb^3$ is 0.00. In the example in FIG. 2, the value of $Nb^3$ is 0.56. It has been experimentally determined that the ratio $E_{1000°\,C.}/E_{RT}$ is directly proportional to $Nb^3$, and that a value of $E_{1000°\,C.}/E_{RT} \leq 1.01$ approximately corresponds to a value of $Nb^3 \leq 0.08$. A value of $E_{1000°\,C.}/E_{RT}$ of 1.05 equates to a value of the value of $Nb^3$ of about 0.10. The relationship between $E_{1000°\,C.}/E_{RT}$ and $Nb^3$ is shown in FIG. 12.

Suitable batch raw materials which may be utilized according to an aspect of the invention are provided in Table 1 below.

TABLE 1

Batch Raw Materials

| Raw Material | Median Particle Diameter (μm) | XRD Morphology Index |
|---|---|---|
| Talc A | 5.5 | 0.88 |
| Talc B | 8.5 | 0.94 |
| Talc C | 10 | 0.90 |
| Talc D | 14 | ~0.75 |
| Talc F | 22 | ~0.94 |
| Talc G | 23 | 0.94 |
| Talc H | 28 | ~0.94 |
| Mg Hydroxide | 0.8 | — |
| Alumina A | 3.4 | — |
| Alumina B | 6.8 | — |
| Alumina C | 7 | — |
| Alumina D | 9 | — |
| Alumina E | 15 | — |
| Alumina F | 5.4 | — |
| Al(OH)$_3$ A | 4.6 | — |
| Al(OH)$_3$ B | 13 | — |
| Al(OH)$_3$ C | 13 | — |
| Al(OH)$_3$ D | 10 | — |
| Al(OH)$_3$ E | 11 | — |
| Boehmite | 0.12 | — |
| Kaolin A | 3.9 | — |
| Kaolin B | 10 | — |
| Quartz A | 4.5 | — |
| Quartz B | 23 | — |
| Quartz C | 25 | — |
| Fused Silica | 11 | — |
| Attapulgite Clay | 2.0 μm × 3 nm | — |
| Bentonite Clay | −325 mesh | — |
| Smectite Clay | 0.025 | — |
| Crushed Potassium Borosilicate Glass Powder | −100 mesh | — |
| Cordierite Powder A | 4.4 | — |
| Cordierite Powder B | 23 | — |
| Graphite A | 9.5 | — |
| Graphite B | 35 | — |
| Graphite C | 49 | — |
| Graphite D | 124 | — |
| Corn starch | 15 | — |

TABLE 1-continued

Batch Raw Materials

| Raw Material | Median Particle Diameter (μm) | XRD Morphology Index |
|---|---|---|
| Potato Starch | 49 | — |
| Polyethylene Beads | 14 | — |
| Polyethylene Wax | 18 | — |

TABLE 2

Comparative Porous Cordierite Ceramic Examples

| | Example # | | | |
|---|---|---|---|---|
| | C1 | C2 | C3 | C4 |
| Talc G | 40.70 | 40.70 | 40.70 | 40.70 |
| Alumina B | 14.80 | 14.80 | 14.80 | 14.80 |
| Al(OH)$_3$ A | 0 | 0 | 16.00 | 16.00 |
| Al(OH)$_3$ B | 0 | 16.00 | 0 | 0 |
| Al(OH)$_3$ D | 16.00 | 0 | 0 | 0 |
| Kaolin A | 16.00 | 16.00 | 16.00 | 16.00 |
| Quartz C | 12.50 | 0 | 12.50 | 12.50 |
| Quartz B | 0 | 12.50 | 0 | 0 |
| Graphite B | 0 | 0 | 20.00 | 0 |
| Graphite D | 0 | 0 | 0 | 20.00 |

TABLE 3

Inventive Porous Cordierite Ceramic Batch Composition Examples

| | Example # | | | | | | |
|---|---|---|---|---|---|---|---|
| | 1 | 2 | 3 | 4 | 5 | 6 | 7 |
| Talc G | 40.70 | 39.68 | 38.52 | 0 | 0 | 0 | 0 |
| Talc F | 0 | 0 | 0 | 39.96 | 38.52 | 38.52 | 40.70 |
| Kaolin B | 16.00 | 4.97 | 12.84 | 0 | 12.84 | 12.84 | 16.00 |
| Alumina A | 0 | 0 | 0 | 21.54 | 0 | 0 | 0 |
| Alumina D | 0 | 19.43 | 12.27 | 0 | 12.27 | 12.27 | 0 |
| Alumina E | 14.80 | 0 | 0 | 0 | 0 | 0 | 14.80 |
| Al(OH)$_3$ A | 16.00 | 16.20 | 21.00 | 0 | 20.99 | 20.99 | 16.00 |
| Al(OH)$_3$ B | 0 | 0 | 0 | 16.35 | 0 | 0 | 0 |
| Quartz B | 12.50 | 19.69 | 15.38 | 22.15 | 15.38 | 15.38 | 12.50 |
| Graphite B | 0 | 0 | 0 | 0 | 80.00 | 0 | 0 |
| Graphite C | 80.00 | 40.00 | 80.00 | 80.00 | 0 | 80.00 | 80.00 |

TABLE 4

Inventive Porous Cordierite Ceramic Batch Composition Examples

| | Example # | | | | | |
|---|---|---|---|---|---|---|
| | 8 | 9-10 | 11 | 12 | 13-14 | 15 |
| Talc A | 0 | 0 | 0 | 0 | 40.00 | 40.00 |
| Talc F | 0 | 40.00 | 0 | 0 | 0 | 0 |
| Talc G | 0 | 0 | 40.38 | 40.00 | 0 | 0 |
| Talc H | 40.38 | 0 | 0 | 0 | 0 | 0 |
| Alumina A | 0 | 0 | 21.77 | 21.81 | 0 | 21.81 |
| Alumina B | 21.77 | 0 | 0 | 0 | 21.81 | 0 |
| Alumina D | 0 | 21.81 | 0 | 0 | 0 | 0 |
| Al(OH)$_3$ A | 10.31 | 0 | 10.31 | 0 | 0 | 0 |
| Al(OH)$_3$ C | 0 | 16.00 | 0 | 16.00 | 16.00 | 16.00 |
| Boehmite | 5.05 | 0 | 5.05 | 0 | 0 | 0 |
| Quartz A | 5.00 | 0 | 5.00 | 22.19 | 22.19 | 22.19 |
| Quartz C | 17.39 | 22.19 | 17.39 | 0 | 0 | 0 |
| Graphite B | 60.00 | 50.00 | 45.00 | 20.00 | 50.00 | 45.00 |
| Corn starch | 0 | 0 | 0 | 10.00 | 10.00 | 15.00 |
| Potato Starch | 10.00 | 10.00 | 15.00 | 0 | 0 | 0 |

TABLE 5

Inventive Porous Cordierite Ceramic Batch Composition Examples

| | Example # | | | | |
|---|---|---|---|---|---|
| | 16 | 17 | 18 | 19 | 20 |
| Talc A | 0 | 0 | 42.38 | 42.38 | 40.31 |
| Talc G | 40.38 | 0 | 0 | 0 | 0 |
| Talc H | 0 | 40.38 | 0 | 0 | 0 |
| Alumina B | 21.77 | 21.77 | 34.12 | 0 | 0 |
| Alumina D | 0 | 0 | 0 | 34.12 | 33.16 |
| Al(OH)$_3$ A | 10.31 | 10.31 | 0 | 0 | 0 |
| Boehmite | 5.05 | 5.05 | 0 | 0 | 0 |
| Quartz A | 5.00 | 5.00 | 23.50 | 23.50 | 21.53 |
| Quartz C | 17.39 | 17.39 | 0 | 0 | 0 |
| Attapulgite Clay | 0 | 0 | 5.00 | 5.00 | 5.00 |
| Graphite B | 40.00 | 50.00 | 45.00 | 45.00 | 45.00 |
| Corn Starch | 0 | 0 | 15.00 | 15.00 | 15.00 |
| Potato Starch | 10.00 | 10.00 | 0 | 0 | 0 |

TABLE 6

Inventive Porous Cordierite Ceramic Batch Composition Examples

| | Example # | | | | | |
|---|---|---|---|---|---|---|
| | 21 | 22 | 23 | 24 | 25 | 26 |
| Talc A | 39.46 | 42.38 | 42.38 | 0 | 0 | 0 |
| Mg Hydroxide | 0 | 0 | 0 | 18.77 | 18.77 | 0 |
| Alumina B | 0 | 30.12 | 30.12 | 28.87 | 28.87 | 0 |
| Alumina D | 15.05 | 0 | 0 | 0 | 0 | 0 |
| Al(OH)$_3$ C | 16.00 | 0 | 0 | 0 | 0 | 0 |
| Boehmite | 0 | 5.00 | 5.00 | 5.00 | 5.00 | 1.79 |
| Kaolin A | 0 | 0 | 0 | 0 | 0 | 3.94 |
| Kaolin B | 16.00 | 0 | 0 | 0 | 0 | 0 |
| Quartz A | 13.49 | 23.50 | 23.50 | 0 | 0 | 0 |
| Fused Silica | 0 | 0 | 0 | 47.36 | 47.36 | 0 |
| Attapulgite Clay | 0 | 5.00 | 0 | 0 | 10.00 | 0 |
| Bentonite Clay | 0 | 0 | 5.00 | 0 | 0 | 0 |
| Smectite Clay | 0 | 0 | 0 | 0 | 0 | 4.27 |
| Cordierite powder B | 0 | 0 | 0 | 0 | 0 | 90.00 |
| Cordierite powder A | 1.00 | 1.00 | 1.00 | 1.00 | 1.00 | 0 |
| Graphite A | 35.00 | 0 | 0 | 40.00 | 0 | 0 |
| Graphite B | 0 | 45.00 | 45.00 | 0 | 50.00 | 15.00 |
| Corn Starch | 10.00 | 15.00 | 15.00 | 10.00 | 10.00 | 10.00 |

TABLE 7

Inventive Porous Cordierite Ceramic Batch Composition Examples

| | Example # | | | | | | | |
|---|---|---|---|---|---|---|---|---|
| | 27-31 | 32 | 33 | 34-35 | 36 | 37-39 | 40 | 41 |
| Talc G | 0 | 0 | 0 | 0 | 0 | 0 | 40.38 | 0 |
| Talc A | 0 | 0 | 0 | 0 | 0 | 42.38 | 0 | 0 |
| Talc C | 42.38 | 0 | 0 | 42.38 | 42.38 | 0 | 0 | 0 |
| Talc B | 0 | 0 | 0 | 0 | 0 | 0 | 0 | 42.38 |
| Talc D | 0 | 40.38 | 40.38 | 0 | 0 | 0 | 0 | 0 |
| Alumina B | 30.12 | 21.77 | 21.77 | 34.12 | 30.12 | 30.12 | 0 | 30.12 |
| Alumina D | 0 | 0 | 0 | 0 | 0 | 0 | 21.77 | 0 |
| Al(OH)$_3$ A | 0 | 0 | 10.31 | 0 | 0 | 0 | 10.31 | 0 |
| Al(OH)$_3$ C | 0 | 10.31 | 0 | 0 | 0 | 0 | 0 | 0 |
| Boehmite | 5.00 | 5.05 | 5.05 | 0 | 5.00 | 5.00 | 5.05 | 5.00 |
| Quartz A | 23.50 | 22.39 | 5.00 | 0 | 23.50 | 23.50 | 5.00 | 23.50 |
| Quartz C | 0 | 0 | 17.39 | 0 | 0 | 0 | 17.39 | 0 |
| Fused Silica | 0 | 0 | 0 | 23.50 | 0 | 0 | 0 | 0 |
| Attapulgite Clay | 5.00 | 0 | 0 | 5.00 | 5.00 | 7.50 | 5.00 | 5.00 |
| Graphite B | 45.00 | 45.00 | 0 | 45.00 | 20.00 | 45.00 | 0 | 45.00 |
| Potato Starch | 0 | 15.00 | 10.00 | 0 | 0 | 0 | 10.00 | 0 |
| Corn Starch | 15.00 | 0 | 0 | 15.00 | 10.00 | 15.00 | 0 | 15.00 |

TABLE 8

Inventive Porous Cordierite Ceramic Batch Composition Examples

| | Example # | | | | | |
|---|---|---|---|---|---|---|
| | 42 | 43 | 44-45 | 46 | 47 | 48 |
| Talc A | 42.38 | 42.38 | 42.38 | 42.38 | 0 | 42.38 |
| Talc C | 0 | 0 | 0 | 0 | 42.38 | 0 |
| Alumina B | 30.12 | 30.12 | 30.12 | 0 | 0 | 0 |
| Alumina C | 0 | 0 | 0 | 30.12 | 30.12 | 30.12 |
| Boehmite | 5.00 | 5.00 | 5.00 | 5.00 | 5.00 | 5.00 |
| Quartz A | 23.50 | 23.50 | 23.50 | 23.50 | 23.50 | 23.50 |
| Crushed Glass | 0 | 0 | 10.00 | 0 | 0 | 0 |
| Attapulgite Clay | 0 | 2.50 | 5.00 | 5.00 | 5.00 | 7.50 |
| Bentonite Clay | 5.00 | 2.50 | 0 | 0 | 0 | 0 |
| Graphite B | 45.00 | 45.00 | 45.00 | 10.00 | 0 | 20.00 |
| Potato Starch | 0 | 0 | 0 | 0 | 10.00 | 0 |
| Corn Starch | 15.00 | 15.00 | 15.00 | 10.00 | 0 | 10.00 |
| Polyethylene Beads | 0 | 0 | 0 | 5.00 | 0 | 0 |

TABLE 9

Inventive Porous Cordierite Ceramic Batch Composition Examples

| | Example Number | | | | | | |
|---|---|---|---|---|---|---|---|
| | 49 | 50 | 51 | 52 | 53 | 54 | 55 |
| Talc D | 0 | 0 | 0 | 0 | 0 | 0 | 38.52 |
| Talc F | 38.52 | 38.52 | 38.52 | 38.52 | 38.52 | 38.52 | 0 |
| Kaolin B | 12.84 | 12.84 | 12.84 | 12.84 | 12.84 | 12.84 | 12.84 |
| Alumina D | 12.27 | 12.27 | 7.27 | 7.27 | 12.27 | 12.27 | 12.27 |
| Alumina F | 0 | 0 | 0 | 5.00 | 0 | 0 | 0 |
| Al(OH)$_3$ A | 20.99 | 20.99 | 20.99 | 20.99 | 20.99 | 20.99 | 20.99 |
| Al(OH)$_3$ E | 0 | 0 | 5.00 | 0 | 0 | 0 | 0 |
| Quartz B | 0 | 0 | 0 | 0 | 0 | 0 | 15.38 |
| Quartz C | 15.38 | 15.38 | 15.38 | 15.38 | 15.38 | 15.38 | 0 |
| Graphite A | 0 | 0 | 0 | 0 | 0 | 80.00 | 0 |
| Graphite B | 0 | 0 | 0 | 0 | 0 | 0 | 80.00 |
| Graphite C | 50.00 | 50.00 | 80.00 | 80.00 | 80.00 | 0 | 0 |
| Polyethylene Wax | 20.00 | 10.00 | 0 | 0 | 0 | 0 | 0 |

As can be seen, the present invention may be manufactured from batches of organic and inorganic materials as described in Tables 3-9 herein. Properties of the comparative and inventive examples of the invention are described in Tables 10-18 below.

TABLE 10

Comparative Porous Cordierite Ceramic Example Properties

| | Example # | | | |
|---|---|---|---|---|
| | C1 | C2 | C3 | C4 |
| Maximum Temperature (° C.) | 1415 | 1400 | 1425 | 1410 |
| Hold Time (hours) | 30 | 14 | 15 | 11 |
| % P (%) | 44.6 | 42.0 | 51.0 | 50.0 |
| $d_1$ (μm) | 1.7 | 1.2 | 2.4 | — |
| $d_2$ (μm) | 2.7 | 2.8 | 3.6 | — |
| $d_5$ (μm) | 4.3 | 5.5 | 4.9 | — |
| $d_{10}$ (μm) | 6.0 | 7.3 | 6.3 | 3.2 |
| $d_{50}$ (μm) | 13.9 | 13.6 | 12.6 | 12.7 |
| $d_{90}$ (μm) | 28.5 | 26.9 | 29.0 | 29.9 |
| $d_{95}$ (μm) | 47.2 | 44.1 | 48.7 | — |
| $d_{98}$ (μm) | 108.9 | 97.0 | 99.5 | — |
| $d_{99}$ (μm) | 182.7 | 166.9 | 153.4 | — |
| df | 0.57 | 0.46 | 0.50 | 0.75 |
| db | 1.61 | 1.44 | 1.80 | 2.10 |
| PCF (%) | 28 | 29.1 | 28.3 | 23.8 |
| CTE, 25-800° C. ($10^{-7}$/° C.) | 4.5 | 4.3 | 4.4 | 1.8 |
| CTE, 500-900° C. ($10^{-7}$/° C.) | 11.4 | 11.3 | 11.4 | 8.9 |
| CTE, 200-1000° C. ($10^{-7}$/° C.) | — | — | — | 6.5 |
| $\Delta\alpha_{mc}$ based on $I_A$, 25-800° C. | 9.2 | 9.3 | 7.6 | 9.9 |
| $I_A$ | 0.41 | 0.41 | 0.36 | 0.39 |
| $I_T$ | 0.82 | 0.86 | 0.87 | 0.87 |
| $\Delta I = I_T - I_A$ | 0.41 | 0.45 | 0.51 | 0.48 |
| % Mullite | 0 | 0.7 | 0.0 | 0 |
| % Spinel + Sapphirine | 4.7 | 3.8 | 4.5 | 2.4 |
| % Alumina | 0 | 0 | 0 | 0 |
| Cell Density (cpsi) | 200 | 200 | 300 | 206 |
| Wall Thickness ($10^{-3}$ inches) | 19 | 19 | 13 | 12.2 |
| CFA | 0.465 | 0.47 | 0.40 | 0.32 |
| MOR (psi) | 707 | 792 | 606 | 336 |
| MOR/CFA (psi) | 1520 | 1685 | 1515 | 1051 |
| E at 25° C. ($10^5$ psi) | 12.7 | 1.35 | 0.892 | 5.62 |
| E at 900° C. ($10^5$ psi) | — | 1.67 | 1.07 | 7.31 |
| E at 1000° C. ($10^5$ psi) | — | 1.87 | 1.16 | 8.39 |
| (E at 900° C.)/(E at 25° C.) | — | 1.24 | 1.20 | 1.30 |
| (E at 1000° C.)/(E at 25° C.) | — | 1.39 | 1.30 | 1.49 |
| $Nb^3$ | — | — | — | 0.560 |
| (MOR/E) at 25° C. | 0.056% | 0.059% | 0.068% | 0.060% |
| TSP (° C.) | 487 | 519 | 596 | 672 |
| TSL (° C.) | 987 | 1019 | 1096 | 1172 |
| TSP* (° C.) | — | — | — | 920 |
| TSL* (° C.) | — | — | — | 1120 |
| $P_{MC}$ Parameter | 10.8 | 7.0 | 7.7 | 9.5 |
| $P_{ST}$ Parameter | 0.044 | 0.054 | 0.063 | 0.052 |

TABLE 11

Inventive Porous Cordierite Ceramic Example Properties

| | Example # | | | | | | |
|---|---|---|---|---|---|---|---|
| | 1 | 2 | 3 | 4 | 5 | 6 | 7 |
| 800-900 Rate (° C./h) | 22 | 22 | 22 | 22 | 22 | 22 | 22 |
| 1150-1200 Rate (° C./h) | 25 | 25 | 25 | 25 | 25 | 25 | 25 |
| 1200-1300 Rate (° C./h) | 25 | 25 | 25 | 25 | 25 | 25 | 25 |
| 1300-1350 Rate (° C./h) | 25 | 25 | 25 | 25 | 25 | 25 | 25 |
| 1350-1400 Rate (° C./h) | 5 | 5 | 5 | 5 | 5 | 5 | 5 |
| Maximum Temperature (° C.) | 1405 | 1405 | 1405 | 1405 | 1405 | 1405 | 1405 |
| Hold Time (h) | 11 | 11 | 11 | 11 | 11 | 11 | 11 |
| % P (%) | 69.0 | 62.6 | 69.0 | 70.1 | 71.7 | 72.0 | 74.5 |
| $d_1$ (μm) | 4.1 | 6.1 | 7.0 | 6.4 | — | — | — |
| $d_2$ (μm) | 6.3 | 7.1 | 8.2 | 7.3 | — | — | — |
| $d_5$ (μm) | 9.6 | 8.9 | 10.4 | 9.1 | — | — | — |

TABLE 11-continued

Inventive Porous Cordierite Ceramic Example Properties

| | Example # | | | | | | |
|---|---|---|---|---|---|---|---|
| | 1 | 2 | 3 | 4 | 5 | 6 | 7 |
| $d_{10}$ (μm) | 13.1 | 11.0 | 13.0 | 11.2 | 10.6 | 11.1 | 16.6 |
| $d_{50}$ (μm) | 25.3 | 19.8 | 22.9 | 20.4 | 18.2 | 20.0 | 28.3 |
| $d_{90}$ (μm) | 54.8 | 38.8 | 42.5 | 36.2 | 32.2 | 35.5 | 50.7 |
| $d_{95}$ (μm) | 93.0 | 58.2 | 69.5 | 54.8 | — | — | — |
| $d_{98}$ (μm) | 169.7 | 119.8 | 140.1 | 116.1 | — | — | — |
| $d_{99}$ (μm) | 217.7 | 177.2 | 194.9 | 176.1 | — | — | — |
| $d_f$ | 0.48 | 0.44 | 0.43 | 0.45 | 0.41 | 0.45 | 0.41 |
| $d_b$ | 1.65 | 1.40 | 1.29 | 1.23 | 1.19 | 1.22 | 1.21 |
| PCF (%) | 42 | 45 | 54 | 57 | 60 | 59 | 62 |
| CTE, 25-800° C. ($10^{-7}$/° C.) | 11.1 | 10.3 | 10.3 | 10.6 | 8.6 | 8.0 | 9.6 |
| CTE, 500-900° C. ($10^{-7}$/° C.) | 18.5 | 17.6 | 17.6 | 17.9 | 15.4 | 14.8 | 16.4 |
| CTE, 200-1000° C. ($10^{-7}$/° C.) | 15.4 | 14.6 | 14.6 | 14.9 | — | — | — |
| $\Delta\alpha_{mc}$ based on $I_A$, 25-800° C. | 1.6 | 2.7 | 2.9 | 3.0 | 4.4 | 4.9 | 4.6 |
| $I_A$ | 0.38 | 0.37 | 0.38 | 0.38 | 0.38 | 0.39 | 0.43 |
| $I_T$ | 0.83 | 0.87 | 0.87 | 0.86 | 0.87 | 0.88 | 0.81 |
| $\Delta I = I_T - I_A$ | 0.45 | 0.50 | 0.49 | 0.48 | 0.49 | 0.49 | 0.38 |
| % Mullite | 0.6 | 0 | 2.2 | 1.2 | 1.4 | 1.9 | 0 |
| % Spinel + Sapphirine | 4.1 | 5.2 | 3.2 | 4.3 | 3.7 | 2.6 | 4.5 |
| % Alumina | 0 | 0.5 | 0 | 0.7 | 0 | 0 | 0 |
| Cell Density (cpsi) | 200 | 200 | 275 | 200 | 275 | — | — |
| Wall Thickness ($10^{-3}$ inches) | 12 | 12 | 14 | 12 | 14 | — | — |
| CFA | 0.311 | 0.311 | 0.410 | 0.311 | 0.410 | — | — |
| MOR (psi) | 97 | 516 | 222 | 344 | 208 | 213 | 121 |
| MOR/CFA (psi) | 312 | 1659 | 541 | 1106 | 507 | — | — |
| E at 25° C. ($10^5$ psi) | 1.14 | 4.56 | 1.84 | 2.22 | 1.84 | 1.66 | 1.23 |
| E at 900° C. ($10^5$ psi) | 1.15 | — | 1.83 | — | — | — | — |
| E at 1000° C. ($10^5$ psi) | 1.17 | — | 1.85 | — | — | — | — |
| (E at 900° C.)/(E at 25° C.) | 1.009 | — | 0.995 | — | — | — | — |
| (E at 1000° C.)/(E at 25° C.) | 1.026 | — | 1.005 | — | — | — | — |
| $Nb^3$ | 0.090 | — | 0.069 | — | — | — | — |
| (MOR/E) at 25° C. | 0.085% | 0.113% | 0.121% | 0.155% | 0.113% | 0.128% | 0.098% |
| TSP (° C.) | 461 | 642 | 685 | 864 | 732 | 863 | 599 |
| TSL (° C.) | 961 | 1142 | 1185 | 1364 | 1232 | 1363 | 1099 |
| TSP* (° C.) | 551 | 773 | 828 | 1040 | — | — | — |
| TSL* (° C.) | 751 | 973 | 1028 | 1240 | — | — | — |
| $P_{MC}$ Parameter | 2.9 | 4.1 | 3.1 | 0.3 | 3.1 | 3.1 | 2.9 |
| $P_{ST}$ Parameter | 0.111 | 0.090 | 0.110 | 0.126 | 0.116 | 0.111 | 0.112 |

TABLE 12

Inventive Porous Cordierite Ceramic Example Properties

| | Example # | | | | | | |
|---|---|---|---|---|---|---|---|
| | 8 | 9 | 10 | 11 | 12 | 13 | 14 |
| 800-900 Rate (° C./h) | 50 | 76 | 75 | 75 | 76 | 75 | 77 |
| 1150-1200 Rate (° C./h) | 50 | 75 | 10 | 10 | 20 | 10 | 10 |
| 1200-1300 Rate (° C./h) | 50 | 75 | 10 | 10 | 50 | 10 | 10 |
| 1300-1350 Rate (° C./h) | 6 | 6 | 75 | 75 | 50 | 75 | 75 |
| 1350-1400 Rate (° C./h) | 6 | 6 | 75 | 75 | 50 | 75 | 75 |
| Maximum Temperature (° C.) | 1425 | 1425 | 1420 | 1410 | 1425 | 1420 | 1425 |
| Hold Time (h) | 30 | 30 | 10 | 10 | 15 | 10 | 10 |
| % P | 66.3 | 65.6 | 58.5 | 65.7 | 59.6 | 65.2 | 67.2 |
| $d_1$ (μm) | 8.5 | 10.7 | 15.7 | 8.6 | 7.5 | 5.2 | 4.2 |
| $d_2$ (μm) | 12.4 | 13.9 | 18.3 | 9.8 | 8.3 | 6.1 | 5.3 |
| $d_5$ (μm) | 17.3 | 17.6 | 22.0 | 11.6 | 10.0 | 7.9 | 7.3 |
| $d_{10}$ (μm) | 21.6 | 21.1 | 25.1 | 13.6 | 11.6 | 9.7 | 9.17 |
| $d_{50}$ (μm) | 37.3 | 32.8 | 37.4 | 21.8 | 18.8 | 16.5 | 15.3 |
| $d_{90}$ (μm) | 70.1 | 62.3 | 80.9 | 44.1 | 34.8 | 25.2 | 23.1 |
| $d_{95}$ (μm) | 109.2 | 92.2 | 129.1 | 71.4 | 55.7 | 43.3 | 37.8 |
| $d_{98}$ (μm) | 172.4 | 143.6 | 197.8 | 132.2 | 104.8 | 120.2 | 107.7 |
| $d_{99}$ (μm) | 223.4 | 180.3 | 250.4 | 186.9 | 150.7 | 184.5 | 176.2 |
| $d_f$ | 0.42 | 0.36 | 0.33 | 0.38 | 0.38 | 0.41 | 0.40 |
| $d_b$ | 1.30 | 1.25 | 1.49 | 1.40 | 1.23 | 0.94 | 0.91 |
| PCF (%) | 51 | 52 | 39 | 47 | 48 | 69 | 74 |
| CTE, 25-800° C. ($10^{-7}$/° C.) | 10.8 | 11.9 | 13.2 | 7.6 | 9.9 | 9.6 | 9.6 |
| CTE, 500-900° C. ($10^{-7}$/° C.) | 17.3 | 18.4 | 19.8 | 13.8 | 16.8 | 16.6 | 15.7 |
| CTE, 200-1000 ($10^{-7}$/° C.) | 14.7 | 15.4 | 17.4 | 11.6 | 14.1 | 13.7 | 13.2 |
| $\Delta\alpha_{mc}$ based on $I_A$, 25-800° C. | 3.2 | 2.2 | 2.4 | 2.5 | 2.6 | 3.3 | 2.5 |
| $I_A$ | 0.43 | 0.43 | 0.47 | 0.33 | 0.40 | 0.42 | 0.38 |

TABLE 12-continued

Inventive Porous Cordierite Ceramic Example Properties

| | Example # | | | | | | |
|---|---|---|---|---|---|---|---|
| | 8 | 9 | 10 | 11 | 12 | 13 | 14 |
| $I_T$ | 0.84 | 0.84 | 0.82 | 0.91 | 0.86 | 0.87 | 0.88 |
| $\Delta I = I_T - I_A$ | 0.41 | 0.41 | 0.35 | 0.58 | 0.46 | 0.45 | 0.50 |
| % Mullite | 2.3 | 1.0 | 1.5 | 1.9 | 1.9 | 1.6 | 1.8 |
| % Spinel + Sapphirine | 2.0 | 3.4 | 2.7 | 1.3 | 1.3 | 1.3 | 1.8 |
| % Alumina | 0 | 0 | 0.8 | 0 | 0 | 0 | 0 |
| Cell Density (cpsi) | 275 | 275 | 286 | 275 | 275 | 275 | 286 |
| Wall Thickness ($10^{-3}$ inches) | 14 | 14 | 14 | 14 | 14 | 14 | 14 |
| CFA | 0.41 | 0.41 | 0.417 | 0.41 | 0.41 | 0.41 | 0.417 |
| MOR (psi) | 335 | 306 | 407 | 395 | 502 | 496 | 407 |
| MOR/CFA (psi) | 816 | 745 | 974 | 963 | 1224 | 1211 | 976 |
| E at 25° C. ($10^5$ psi) | 0.269 | 0.226 | 4.17 | 0.380 | 0.540 | 0.338 | 2.59 |
| E at 900° C. ($10^5$ psi) | 0.262 | 0.219 | — | 0.376 | 0.531 | 0.323 | — |
| E at 1000° C. ($10^5$ psi) | 0.262 | 0.219 | — | 0.381 | 0.538 | 0.324 | — |
| (E at 900° C.)/(E at 25° C.) | 0.97 | 0.97 | — | 0.99 | 0.98 | 0.96 | — |
| (E at 1000° C.)/(E at 25° C.) | 0.97 | 0.97 | — | 1.00 | 1.00 | 0.96 | — |
| $Nb^3$ | 0.046 | 0.037 | — | 0.075 | 0.070 | 0.038 | — |
| MOR/E | 0.124% | 0.135% | 0.097% | 0.104% | 0.093% | 0.147% | 0.157% |
| TSP (° C.) | 719 | 735 | 489 | 753 | 553 | 885 | 932 |
| TSL (° C.) | 1219 | 1235 | 989 | 1253 | 1053 | 1385 | 1432 |
| TSP* (° C.) | 844 | 877 | 561 | 897 | 660 | 1073 | 1194 |
| TSL* (° C.) | 1044 | 1077 | 761 | 1097 | 860 | 1273 | 1394 |
| $P_{MC}$ Parameter | 3.0 | 3.0 | 0.1 | 2.6 | 4.6 | 0.6 | 0.6 |
| $P_{ST}$ Parameter | 0.115 | 0.121 | 0.121 | 0.106 | 0.092 | 0.130 | 0.130 |

TABLE 13

Inventive Porous Cordierite Ceramic Example Properties

| | Example # | | | | | |
|---|---|---|---|---|---|---|
| | 15 | 16 | 17 | 18 | 19 | 20 |
| 800-900 Rate (° C./h) | 76 | 75 | 75 | 76 | 76 | 76 |
| 1150-1200 Rate (° C./h) | 75 | 10 | 10 | 75 | 75 | 75 |
| 1200-1300 Rate (° C./h) | 75 | 10 | 10 | 75 | 75 | 75 |
| 1300-1350 Rate (° C./h) | 27 | 75 | 75 | 27 | 27 | 6 |
| 1350-1400 Rate (° C./h) | 4 | 75 | 75 | 4 | 4 | 6 |
| Maximum Temperature (° C.) | 1428 | 1420 | 1420 | 1428 | 1428 | 1428 |
| Hold Time (h) | 30 | 10 | 10 | 30 | 30 | 30 |
| % P (%) | 65.7 | 64.5 | 65.8 | 65.8 | 61.9 | 68.3 |
| $d_1$ (μm) | 6.2 | 8.3 | 12.4 | 4.9 | 11.8 | 11.3 |
| $d_2$ (μm) | 7.7 | 9.7 | 14.1 | 7.4 | 13.9 | 13.8 |
| $d_5$ (μm) | 9.9 | 11.6 | 16.5 | 10.0 | 18.3 | 17.8 |
| $d_{10}$ (μm) | 11.7 | 13.5 | 18.8 | 11.9 | 22.6 | 21.4 |
| $d_{50}$ (μm) | 18.4 | 23.1 | 31.0 | 16.9 | 36.2 | 31.2 |
| $d_{90}$ (μm) | 29.9 | 49.6 | 92.0 | 26.2 | 73.3 | 64.8 |
| $d_{95}$ (μm) | 47.9 | 79.6 | 168.3 | 40.4 | 113.6 | 125.1 |
| $d_{98}$ (μm) | 93.0 | 141.1 | 250.5 | 86.7 | 177.0 | 227.2 |
| $d_{99}$ (μm) | 138.0 | 191.3 | 284.8 | 136.7 | 235.1 | 292.9 |
| $d_f$ | 0.36 | 0.42 | 0.39 | 0.30 | 0.38 | 0.31 |
| $d_b$ | 0.99 | 1.57 | 2.36 | 0.85 | 1.40 | 1.39 |
| PCF | 66 | 41 | 28 | 78 | 44 | 49 |
| CTE, 25-800° C. ($10^{-7}$/° C.) | 10.1 | 9.6 | 9.1 | 9.6 | 10.3 | 10.0 |
| CTE, 500-900° C. ($10^{-7}$/° C.) | 17.5 | 14.7 | 16.0 | 16.0 | 17.3 | 16.9 |
| CTE, 200-1000 ($10^{-7}$/° C.) | 14.6 | 12.1 | 13.5 | 13.5 | 14.3 | 13.9 |
| $\Delta\alpha_{mc}$ based on $I_A$, 25-800° C. | 2.6 | 2.0 | 2.6 | 1.2 | 2.6 | 3.2 |
| $I_A$ | 0.42 | 0.32 | 0.35 | 0.33 | 0.46 | 0.46 |
| $I_T$ | 0.85 | 0.90 | 0.89 | 0.89 | 0.83 | 0.84 |
| $\Delta I = I_T - I_A$ | 0.43 | 0.58 | 0.54 | 0.56 | 0.37 | 0.38 |
| % Mullite | 1.5 | 1.7 | 2.5 | 0 | 0 | 0 |
| % Spinel + Sapphirine | 1.0 | 1.8 | 2.2 | 0.9 | 1.0 | 1.4 |
| % Alumina | 0 | 0 | 0 | 0 | 0 | 0 |
| Cell Density (cpsi) | 275 | 275 | 275 | 275 | 275 | 275 |
| Wall Thickness ($10^{-3}$ inches) | 14 | 14 | 14 | 14 | 14 | 14 |
| CFA | 0.41 | 0.41 | 0.41 | 0.41 | 0.41 | 0.41 |
| MOR (psi) | 523 | 397 | 306 | 748 | 587 | 691 |
| MOR/CFA (psi) | 1276 | 968 | 746 | 1824 | 1432 | 1685 |
| E at 25° C. ($10^5$ psi) | 0.339 | 0.420 | 0.289 | 0.458 | 0.454 | 0.466 |
| E at 900° C. ($10^5$ psi) | 0.334 | 0.410 | 0.286 | 0.425 | 0.425 | 0.442 |
| E at 1000° C. ($10^5$ psi) | 0.337 | 0.418 | 0.291 | 0.431 | 0.433 | 0.449 |
| (E at 900° C.)/(E at 25° C.) | 0.99 | 0.98 | 0.99 | 0.93 | 0.94 | 0.95 |

TABLE 13-continued

Inventive Porous Cordierite Ceramic Example Properties

| | Example # | | | | | |
|---|---|---|---|---|---|---|
| | 15 | 16 | 17 | 18 | 19 | 20 |
| (E at 1000° C.)/(E at 25° C.) | 0.99 | 1.00 | 1.01 | 0.94 | 0.95 | 0.96 |
| $Nb^3$ | 0.068 | 0.063 | 0.072 | 0.024 | 0.036 | 0.046 |
| MOR/E | 0.154% | 0.095% | 0.107% | 0.163% | 0.129% | 0.148% |
| TSP (° C.) | 882 | 643 | 662 | 1021 | 750 | 877 |
| TSL (° C.) | 1382 | 1143 | 1162 | 1521 | 1250 | 1377 |
| TSP* (° C.) | 1055 | 785 | 793 | 1207 | 902 | 1065 |
| TSL* (° C.) | 1255 | 985 | 993 | 1407 | 1102 | 1265 |
| $P_{MC}$ Parameter | 4.1 | 2.6 | 1.9 | 2.3 | 1.6 | 1.6 |
| $P_{ST}$ Parameter | 0.127 | 0.102 | 0.107 | 0.144 | 0.148 | 0.147 |

TABLE 14

Inventive Porous Cordierite Ceramic Example Properties

| | Example # | | | | | |
|---|---|---|---|---|---|---|
| | 21 | 22 | 23 | 24 | 25 | 26 |
| 800-900 Rate (° C./h) | 75 | 75 | 75 | 75 | 75 | 75 |
| 1150-1200 Rate (° C./h) | 20 | 20 | 20 | 20 | 20 | 20 |
| 1200-1300 Rate (° C./h) | 10 | 10 | 10 | 10 | 10 | 10 |
| 1300-1340 Rate (° C./h) | 10 | 10 | 10 | 10 | 10 | 10 |
| 1350-1400 Rate (° C./h) | 10 | 10 | 10 | 10 | 10 | 10 |
| Maximum Temperature (° C.) | 1360 | 1380 | 1380 | 1400 | 1340 | 1340 |
| Hold Time (h) | 20 | 20 | 20 | 20 | 15 | 15 |
| % P (%) | 61.0 | 56.5 | 57.2 | 59.6 | 63.2 | 52.5 |
| $d_1$ (μm) | 1.2 | 1.0 | 1.4 | 0.7 | 3.1 | 1.6 |
| $d_2$ (μm) | 3.0 | 2.0 | 2.1 | 1.3 | 3.7 | 2.1 |
| $d_5$ (μm) | 4.6 | 3.5 | 3.4 | 2.5 | 4.7 | 3.1 |
| $d_{10}$ (μm) | 6.1 | 4.8 | 4.6 | 3.6 | 5.9 | 4.1 |
| $d_{25}$ (μm) | 8.9 | 6.9 | 6.5 | 5.8 | 8.0 | 6.2 |
| $d_{50}$ (μm) | 11.5 | 8.5 | 8.2 | 8.3 | 10.5 | 7.9 |
| $d_{75}$ (μm) | 12.9 | 9.6 | 9.3 | 11.5 | 13.2 | 9.2 |
| $d_{90}$ (μm) | 15.1 | 13.1 | 13.0 | 21.0 | 19.7 | 11.7 |
| $d_{95}$ (μm) | 26.6 | 49.7 | 49.0 | 58.6 | 47.5 | 26.0 |
| $d_{98}$ (μm) | 105.0 | 171.8 | 164.9 | 177.0 | 167.5 | 118.4 |
| $d_{99}$ (μm) | 169.7 | 229.3 | 221.0 | 234.4 | 246.1 | 205.6 |
| $d_f$ | 0.47 | 0.43 | 0.44 | 0.57 | 0.44 | 0.48 |
| $d_b$ | 0.78 | 0.97 | 1.03 | 2.09 | 1.32 | 0.95 |
| PCF (%) | 78 | 58 | 56 | 28 | 48 | 55 |
| CTE, 25-800 ($10^{-7}$/° C.) | 14.6 | 14.5 | 14.7 | 14.1 | 17.8 | 15.8 |
| CTE, 500-900 ($10^{-7}$/° C.) | 22.2 | 21.0 | 22.1 | 21.0 | 24.7 | 22.4 |
| CTE, 200-1000 ($10^{-7}$/° C.) | 19.6 | 18.6 | 19.5 | 18.7 | 21.5 | 20.1 |
| $\Delta\alpha_{mc}$ based on $I_A$, 25-800° C. | 2.6 | 2.5 | 2.3 | — | 0.3 | 2.3 |
| $I_A$ | 0.59 | 0.61 | 0.61 | — | 0.59 | 0.64 |
| $I_T$ | 0.65 | 0.68 | 0.68 | — | 0.66 | 0.66 |
| $\Delta I = I_T - I_A$ | 0.06 | 0.07 | 0.07 | — | 0.07 | 0.02 |
| % Mullite | 0 | 0 | 0.5 | 0 | 0 | 1.2 |
| % Spinel + Sapphirine | 2.5 | 1.3 | 0.8 | 0.8 | 3.0 | 0.7 |
| % Alumina | 0 | 0 | 0 | 0 | 0 | 0 |
| Cell Density (cpsi) | 293 | 300 | 300 | 324 | 300 | 293 |
| Wall Thickness ($10^{-3}$ inches) | 14 | 13 | 13 | 15 | 13 | 14 |
| CFA | 0.422 | 0.400 | 0.400 | 0.467 | 0.400 | 0.422 |
| MOR (psi) | 517 | 972 | 972 | 517 | 670 | 640 |
| MOR/CFA (psi) | 1225 | 2430 | 2430 | 1107 | 1675 | 1517 |
| E at 25° C. ($10^5$ psi) | 4.13 | 9.04 | 9.33 | 5.73 | 5.08 | 6.29 |
| E at 900° C. ($10^5$ psi) | 3.87 | 8.39 | — | 5.44 | 4.59 | 6.34 |
| E at 1000° C. ($10^5$ psi) | 3.83 | 8.13 | — | 5.43 | 4.17 | 6.33 |
| (E at 900° C.)/(E at 25° C.) | 0.937 | 0.928 | — | 0.949 | 0.904 | 1.008 |
| (E at 1000° C.)/(E at 25° C.) | 0.927 | 0.899 | — | 0.948 | 0.821 | 1.006 |
| $Nb^3$ | 0.014 | 0.003 | — | 0.026 | 0.007 | 0.065 |
| MOR/E | 0.125% | 0.107% | 0.104% | 0.090% | 0.132% | 0.102% |
| TSP (° C.) | 563 | 512 | 471 | 430 | 533 | 455 |
| TSL (° C.) | 1063 | 1012 | 971 | 930 | 1033 | 955 |
| TSP* (° C.) | 639 | 603 | 534 | 482 | 612 | 507 |
| TSL* (° C.) | 839 | 803 | 734 | 682 | 812 | 707 |
| $P_{MC}$ Parameter | 5.4 | 0.7 | 0.7 | 3.8 | −1.5 | — |
| $P_{ST}$ Parameter | 0.108 | 0.143 | 0.143 | 0.123 | 0.164 | — |

TABLE 15

Inventive Porous Cordierite Ceramic Example Properties

| | Example # | | | | | | |
|---|---|---|---|---|---|---|---|
| | 27 | 28 | 29 | 30 | 31 | 32 | 33 |
| 800-900 Rate (° C./h) | 75 | 77 | 75 | 76 | 76 | 75 | 75 |
| 1150-1200 Rate (° C./h) | 75 | 10 | 75 | 75 | 75 | 10 | 10 |
| 1200-1300 Rate (° C./h) | 75 | 10 | 75 | 75 | 75 | 10 | 10 |
| 1300-1340 Rate (° C./h) | 6 | 75 | 6 | 6 | 6 | 75 | 75 |
| 1350-1400 Rate (° C./h) | 6 | 75 | 6 | 6 | 6 | 75 | 75 |
| Maximum Temperature (° C.) | 1415 | 1425 | 1425 | 1428 | 1435 | 1420 | 1420 |
| Hold Time (h) | 30 | 10 | 30 | 30 | 30 | 10 | 10 |
| % P (%) | 61.7 | 65.5 | 62.6 | 63.5 | 61.4 | 68.5 | 53.8 |
| $d_1$ (μm) | — | 4.7 | 6.5 | 4.5 | 5.7 | 3.9 | 3.9 |
| $d_2$ (μm) | — | 5.5 | 7.3 | 7.0 | 7.4 | 5.2 | 5.2 |
| $d_5$ (μm) | — | 6.8 | 8.7 | 9.6 | 9.4 | 7.1 | 7.8 |
| $d_{10}$ (μm) | 13.3 | 8.3 | 9.9 | 11.3 | 11.0 | 9.2 | 10.2 |
| $d_{50}$ (μm) | 18.0 | 13.0 | 14.5 | 16.8 | 15.5 | 17.8 | 19.3 |
| $d_{90}$ (μm) | 24.9 | 17.0 | 31.1 | 24.7 | 23.1 | 44.1 | 45.7 |
| $d_{95}$ (μm) | — | 22.3 | 68.6 | 40.4 | 36.7 | 117.5 | 82.9 |
| $d_{98}$ (μm) | — | 44.5 | 143.3 | 101.0 | 92.3 | 214.4 | 170.6 |
| $d_{99}$ (μm) | — | 88.7 | 205.7 | 159.8 | 160.8 | 260.7 | 233.7 |
| $d_f$ (μm) | 0.26 | 0.36 | 0.31 | 0.32 | 0.29 | 0.48 | 0.47 |
| $d_b$ (μm) | 0.65 | 0.67 | 1.46 | 0.80 | 0.78 | 1.96 | 1.84 |
| PCF (%) | 95 | 98 | 43 | 80 | 79 | 35 | 29 |
| CTE, 25-800 ($10^{-7}$/° C.) | 11.0 | 9.9 | 11.5 | 12.0 | 10.8 | 9.6 | 10.3 |
| CTE, 500-900 ($10^{-7}$/° C.) | — | 16.2 | 17.3 | 18.8 | 16.3 | 16.6 | 16.2 |
| CTE, 200-1000 ($10^{-7}$/° C.) | — | 13.5 | 12.4 | 16.0 | 13.8 | 14.0 | 14.4 |
| $\Delta\alpha_{mc}$ based on $I_A$, 25-800° C. | 2.4 | 1.5 | 1.7 | 0.5 | 1.4 | 3.5 | 1.7 |
| $I_A$ | 0.47 | 0.41 | 0.47 | 0.44 | 0.44 | 0.44 | 0.39 |
| $I_T$ | 0.84 | 0.87 | 0.86 | 0.86 | 0.86 | 0.87 | 0.87 |
| $\Delta I = I_T - I_A$ | 0.37 | 0.46 | 0.39 | 0.42 | 0.42 | 0.43 | 0.48 |
| % Mullite | 0 | 0 | 1.0 | 0.7 | 0.8 | 0.7 | 1.9 |
| % Spinel + Sapphirine | 1.3 | 0.8 | 0 | 0.5 | 0 | 1.5 | 1 |
| % Alumina | 0 | 0 | 0 | 0 | 0 | 0 | 0 |
| Cell Density (cells/inch$^2$) | 286 | 286 | 400 | 275 | 275 | 391 | 281 |
| Wall Thickness ($10^{-3}$ inches) | 14.0 | 14 | 6 | 14 | 14 | 6.9 | 9.8 |
| CFA | 0.417 | 0.417 | 0.23 | 0.41 | 0.41 | 0.254 | 0.302 |
| MOR (psi) | 884 | 688 | 516 | 692 | 868 | 228 | 503 |
| MOR/CFA (psi) | 2117 | 1649 | 2283 | 1688 | 2117 | 897 | 1667 |
| E at RT ($10^5$ psi) | 4.78 | 4.23 | 0.406 | 0.489 | 0.565 | 1.95 | 5.06 |
| E at 900° C. ($10^5$ psi) | — | — | 0.386 | 0.458 | 0.537 | 1.92 | 4.82 |
| E at 1000° C. ($10^5$ psi) | — | — | 0.384 | 0.454 | 0.533 | 1.89 | 4.79 |
| (E at 900° C.)/(E at RT) | — | — | 0.95 | 0.94 | 0.95 | 0.985 | 0.953 |
| (E at 1000° C.)/(E at RT) | — | — | 0.95 | 0.93 | 0.94 | 0.969 | 0.947 |
| Nb$^3$ | — | — | 0.028 | 0.017 | 0.022 | 0.053 | 0.046 |
| MOR/E at RT | 0.185% | 0.163% | 0.127% | 0.142% | 0.154% | 0.117% | 0.099% |
| TSP (° C.) | 1040 | 946 | 735 | 753 | 943 | 712 | 581 |
| TSL (° C.) | 1540 | 1446 | 1235 | 1253 | 1443 | 1212 | 1081 |
| TSP* (° C.) | — | 1210 | 1024 | 888 | 1116 | 837 | 690 |
| TSL* (° C.) | — | 1410 | 1224 | 1088 | 1316 | 1037 | 890 |
| $P_{MC}$ Parameter | 2.4 | −0.4 | 2.4 | 2.5 | 2.5 | 1.2 | 5.2 |
| $P_{ST}$ Parameter | 0.143 | 0.143 | 0.143 | 0.143 | 0.143 | 0.119 | 0.084 |

TABLE 16

Inventive Porous Cordierite Ceramic Example Properties

| | Example # | | | | | | | |
|---|---|---|---|---|---|---|---|---|
| | 34 | 35 | 36 | 37 | 38 | 39 | 40 | 41 |
| 800-900 Rate (° C./h) | 75 | 76 | 76 | 34 | 34 | 34 | 34 | 34 |
| 1150-1200 Rate (° C./h) | 75 | 75 | 20 | 25 | 75 | 75 | 75 | 75 |
| 1200-1300 Rate (° C./h) | 75 | 75 | 50 | 25 | 75 | 75 | 75 | 75 |
| 1300-1340 Rate (° C./h) | 6 | 6 | 50 | 25 | 6 | 6 | 6 | 6 |
| 1350-1400 Rate (° C./h) | 6 | 6 | 50 | 5 | 6 | 6 | 6 | 6 |
| Maximum Temperature (° C.) | 1415 | 1435 | 1432 | 1409 | 1412 | 1415 | 1412 | 1415 |
| Hold Time (h) | 15 | 30 | 15 | 11 | 15 | 30 | 15 | 30 |
| % P (%) | 59.1 | 59.2 | 56.8 | 63.8 | 60.3 | 61.3 | 51.3 | 62.8 |
| $d_1$ (μm) | — | 12.6 | 7.5 | 2.4 | 8.4 | 5.5 | 7.1 | 7.4 |
| $d_2$ (μm) | — | 14.5 | 8.3 | 5.5 | 9.7 | 10.7 | 8.0 | 8.5 |
| $d_5$ (μm) | — | 17.1 | 9.5 | 8.3 | 11.4 | 13.3 | 9.6 | 10.4 |
| $d_{10}$ (μm) | 19.4 | 19.3 | 10.6 | 9.9 | 12.9 | 15.2 | 11.5 | 12.0 |
| $d_{50}$ (μm) | 29.0 | 27.8 | 14.1 | 14.4 | 18.2 | 21.1 | 19.6 | 17.6 |
| $d_{90}$ (μm) | 58.2 | 52.0 | 20.3 | 23.9 | 26.6 | 32.0 | 36.0 | 25.7 |

TABLE 16-continued

Inventive Porous Cordierite Ceramic Example Properties

| Example # | 34 | 35 | 36 | 37 | 38 | 39 | 40 | 41 |
|---|---|---|---|---|---|---|---|---|
| $d_{95}$ (μm) | — | 80.0 | 40.2 | 37.0 | 50.3 | 52.2 | 59.7 | 38.5 |
| $d_{98}$ (μm) | — | 145.4 | 119.0 | 74.2 | 134.6 | 110.8 | 124.7 | 85.5 |
| $d_{99}$ (μm) | — | 201.1 | 191.9 | 114.7 | 189.9 | 165.3 | 178.4 | 138.4 |
| $d_f$ | 0.33 | 0.31 | 0.24 | 0.31 | 0.29 | 0.28 | 0.41 | 0.32 |
| $d_b$ | 1.34 | 1.17 | 0.68 | 0.97 | 0.75 | 0.79 | 1.25 | 0.78 |
| PCF (%) | 44 | 50 | 83 | 66 | 80 | 77 | 41 | 81 |
| CTE, 25-800 ($10^{-7}$/° C.) | 13.2 | 10.2 | 9.5 | 13.8 | 13.8 | 14.2 | 11.7 | 12.1 |
| CTE, 500-900 ($10^{-7}$/° C.) | — | 16.3 | 15.5 | 19.9 | 20.4 | 20.9 | 19.1 | 18.6 |
| CTE, 200-1000 ($10^{-7}$/° C.) | — | 14.1 | 13.2 | 17.5 | 17.5 | 18.2 | 16.1 | 16.1 |
| $\Delta\alpha_{mc}$ based on $I_A$, 25-800° C. | 0.1 | 2.0 | 2.5 | −1.0 | 1.6 | 0.9 | 1.6 | 1.9 |
| $I_A$ | 0.44 | 0.44 | 0.43 | 0.44 | 0.54 | 0.55 | 0.43 | 0.50 |
| $I_T$ | 0.85 | 0.86 | 0.86 | 0.86 | 0.75 | 0.77 | 0.86 | 0.81 |
| $\Delta I = I_T - I_A$ | 0.41 | 0.42 | 0.43 | 0.42 | 0.21 | 0.22 | 0.43 | 0.31 |
| % Mullite | 0 | 0 | 0 | 0 | 0 | 0 | 0 | 0 |
| % Spinel + Sapphirine | 2.5 | 0.8 | 0.9 | 1.7 | 1.7 | 0.7 | 3.1 | 1.1 |
| % Alumina | 0 | 0 | 0 | 0 | 0 | 0 | 0 | 0 |
| Cell Density (cells/inch$^2$) | 286 | 286 | 286 | 391 | 286 | 286 | 286 | 286 |
| Wall Thickness ($10^{-3}$ inches) | 14.0 | 14 | 14 | 6.9 | 14 | 14 | 14 | 14 |
| CFA | 0.417 | 0.417 | 0.417 | 0.254 | 0.417 | 0.417 | 0.417 | 0.417 |
| MOR (psi) | 669 | 699 | 1107 | 581 | 1060 | 992 | 1031 | 873 |
| MOR/CFA (psi) | 1601 | 1673 | 2651 | 2286 | 2540 | 2377 | 2468 | 2091 |
| E at RT ($10^5$ psi) | 5.06 | 5.31 | 7.74 | 3.03 | 5.65 | 5.52 | 11.4 | 4.51 |
| E at 900° C. ($10^5$ psi) | — | — | — | — | 4.98 | — | — | — |
| E at 1000° C. ($10^5$ psi) | — | — | — | — | 5.00 | — | — | — |
| (E at 900° C.)/(E at RT) | — | — | — | — | 0.88 | — | — | — |
| (E at 1000° C.)/(E at RT) | — | — | — | — | 0.88 | — | — | — |
| Nb$^3$ | — | — | — | — | 0.014 | — | — | — |
| MOR/E at RT | 0.132% | 0.132% | 0.143% | 0.192% | 0.188% | 0.180% | 0.090% | 0.194% |
| TSP (° C.) | 663 | 724 | 876 | 935 | 914 | 859 | 489 | 1026 |
| TSL (° C.) | 1163 | 1274 | 1376 | 1435 | 1414 | 1359 | 989 | 1526 |
| TSP* (° C.) | — | 930 | 1086 | 1098 | 1070 | 988 | 563 | 1206 |
| TSL* (° C.) | — | 1130 | 1286 | 1298 | 1270 | 1188 | 763 | 1406 |
| $P_{MC}$ Parameter | 2.2 | 2.2 | 3.0 | 0.0 | 0.1 | 1.3 | 4.2 | 2.4 |
| $P_{ST}$ Parameter | 0.144 | 0.144 | 0.118 | 0.152 | 0.152 | 0.152 | 0.093 | 0.140 |

TABLE 17

Inventive Porous Cordierite Ceramic Example Properties

| Example # | 42 | 43 | 44 | 45 | 46 | 47 | 48 |
|---|---|---|---|---|---|---|---|
| 800-900 Rate (° C./h) | 75 | 75 | 34 | 34 | 76 | 34 | 34 |
| 1150-1200 Rate (° C./h) | 20 | 20 | 75 | 75 | 75 | 75 | 75 |
| 1200-1300 Rate (° C./h) | 10 | 10 | 75 | 75 | 75 | 75 | 75 |
| 1300-1340 Rate (° C./h) | 10 | 10 | 6 | 6 | 6 | 6 | 6 |
| 1350-1400 Rate (° C./h) | 10 | 10 | 6 | 6 | 6 | 6 | 6 |
| Maximum Temperature (° C.) | 1400 | 1400 | 1415 | 1400 | 1418 | 1412 | 1415 |
| Hold Time (h) | 20 | 20 | 30 | 30 | 30 | 15 | 30 |
| % P (%) | 61.9 | 61.8 | 58.2 | 58.1 | 56.5 | 48.6 | 54.0 |
| $d_1$ (μm) | — | — | 4.6 | 11.8 | 4.2 | 3.1 | 4.7 |
| $d_2$ (μm) | — | — | 10.3 | 13.0 | 5.0 | 3.5 | 6.3 |
| $d_5$ (μm) | — | — | 13.8 | 14.7 | 6.6 | 4.3 | 7.7 |
| $d_{10}$ (μm) | 8.0 | 7.4 | 15.5 | 16.0 | 8.1 | 5.2 | 9.0 |
| $d_{50}$ (μm) | 11.2 | 10.9 | 20.1 | 20.0 | 12.4 | 10.4 | 13.9 |
| $d_{90}$ (μm) | 16.4 | 16.2 | 28.2 | 34.1 | 17.8 | 18.2 | 24.3 |
| $d_{95}$ (μm) | — | — | 40.4 | 66.5 | 31.8 | 28.2 | 48.7 |
| $d_{98}$ (μm) | — | — | 72.9 | 142.8 | 101.4 | 84.6 | 115.3 |
| $d_{99}$ (μm) | — | — | 101.9 | 203.0 | 167.4 | 155.7 | 161.3 |
| $d_f$ | 0.29 | 0.32 | 0.23 | 0.20 | 0.35 | 0.50 | 0.35 |
| $d_b$ | 0.74 | 0.81 | 0.63 | 0.91 | 0.79 | 1.25 | 1.10 |
| PCF | 83 | 76 | 92 | 64 | 72 | 39 | 49 |
| CTE, 25-800 ($10^{-7}$/° C.) | 12.6 | 12.0 | 14.0 | 13.1 | 11.8 | 10.9 | 12.1 |
| CTE, 500-900 ($10^{-7}$/° C.) | — | — | 21.2 | 19.5 | 18.7 | 18.4 | 19.0 |
| CTE, 200-1000 ($10^{-7}$/° C.) | — | — | 18.4 | 17.1 | 16.0 | 15.7 | 16.1 |
| $\Delta\alpha_{mc}$ based on $I_A$, 25-800° C. | 2.4 | 1.6 | 1.8 | 4.3 | 1.3 | 2.5 | 1.2 |
| $I_A$ | 0.52 | 0.48 | 0.54 | 0.54 | 0.47 | 0.45 | 0.48 |
| $I_T$ | 0.82 | 0.82 | 0.78 | 0.80 | 0.85 | 0.83 | 0.87 |
| $\Delta I = I_T - I_A$ | 0.30 | 0.34 | 0.24 | 0.26 | 0.38 | 0.38 | 0.39 |
| % Mullite | 0.8 | 0 | 1.0 | 0 | 0 | 0 | 0 |

TABLE 17-continued

Inventive Porous Cordierite Ceramic Example Properties

| | Example # | | | | | | |
|---|---|---|---|---|---|---|---|
| | 42 | 43 | 44 | 45 | 46 | 47 | 48 |
| % Spinel + Sapphirine | 1.1 | 1.3 | 1.3 | 2.4 | 0.8 | 2.3 | 0.7 |
| % Alumina | 0 | 0 | 0 | 2.6 | 0 | 0 | 0 |
| Cell Density (cells/inch$^2$) | 324 | 324 | 286 | 188 | 286 | 286 | 275 |
| Wall Thickness ($10^{-3}$ inches) | 15.4 | 15.4 | 14 | 13 | 14 | 14 | 8 |
| CFA | 0.477 | 0.477 | 0.417 | 0.325 | 0.417 | 0.417 | 0.248 |
| MOR (psi) | 924 | 711 | 845 | 630 | 1009 | 1047 | 676 |
| MOR/CFA (psi) | 1934 | 1489 | 2025 | 1941 | 2417 | 2510 | 2726 |
| E at RT ($10^5$ psi) | 5.29 | 4.63 | 6.61 | 5.14 | 7.59 | 11.8 | 5.82 |
| E at 900° C. ($10^5$ psi) | 4.99 | — | — | — | — | — | — |
| E at 1000° C. ($10^5$ psi) | 4.87 | — | — | — | — | — | — |
| (E at 900° C.)/(E at RT) | 0.943 | — | — | — | — | — | — |
| (E at 1000° C.)/(E at RT) | 0.921 | — | — | — | — | — | — |
| Nb$^3$ | 0.023 | — | — | — | — | — | — |
| MOR/E at RT | 0.175% | 0.154% | 0.128% | 0.123% | 0.133% | 0.089% | 0.116% |
| TSP (° C.) | 902 | 808 | 617 | 618 | 716 | 502 | 616 |
| TSL (° C.) | 1402 | 1308 | 1117 | 1118 | 1216 | 1002 | 1116 |
| TSP* (° C.) | — | — | 695 | 700 | 833 | 567 | 721 |
| TSL* (° C.) | — | — | 895 | 900 | 1033 | 767 | 921 |
| $P_{MC}$ Parameter | 0.7 | 0.7 | 2.4 | 2.4 | 4.7 | 4.5 | 3.2 |
| $P_{ST}$ Parameter | 0.143 | 0.143 | 0.143 | 0.143 | 0.115 | 0.098 | 0.129 |

TABLE 18

Inventive Porous Cordierite Ceramic Example Properties

| | Example # | | | | | | |
|---|---|---|---|---|---|---|---|
| | 49 | 50 | 51 | 52 | 53 | 54 | 55 |
| 800-900 Rate (° C./h) | 37 | 37 | 111 | 37 | 111 | 111 | 111 |
| 1150-1200 Rate (° C./h) | 25 | 25 | 40 | 25 | 40 | 40 | 40 |
| 1200-1300 Rate (° C./h) | 25 | 25 | 28 | 25 | 28 | 28 | 28 |
| 1300-1350 Rate (° C./h) | 25 | 25 | 28 | 25 | 28 | 28 | 28 |
| 1350-1400 Rate (° C./h) | 5 | 5 | 6 | 5 | 28 | 28 | 28 |
| Maximum Temperature (° C.) | 1409 | 1409 | 1409 | 1409 | 1405 | 1405 | 1405 |
| Hold Time (h) | 11 | 11 | 6 | 11 | 12 | 12 | 12 |
| % P (%) | 71.0 | 69.2 | 71.3 | 68.2 | 69.6 | 69.6 | 71.4 |
| $d_1$ (μm) | 6.6 | 7.3 | 14.4 | 11.8 | 13.7 | 11.3 | 8.6 |
| $d_5$ (μm) | 10.2 | 10.5 | 18.7 | 15.5 | 17.7 | 15.3 | 12.3 |
| $d_{10}$ (μm) | 12.3 | 12.4 | 21.1 | 17.7 | 20.1 | 17.7 | 14.3 |
| $d_{50}$ (μm) | 20.6 | 20.6 | 31.1 | 26.6 | 28.6 | 26.8 | 20.9 |
| $d_{90}$ (μm) | 36.4 | 39.4 | 52.9 | 47.0 | 48.8 | 57.8 | 34.7 |
| $d_{95}$ (μm) | 58.1 | 62.7 | 84.0 | 77.4 | 75.1 | 94.9 | 55.2 |
| $d_{99}$ (μm) | 185.3 | 185.3 | 206.5 | 168.4 | 192.5 | 227.8 | 174.3 |
| $d_f$ | 0.40 | 0.40 | 0.32 | 0.33 | 0.30 | 0.34 | 0.32 |
| $d_b$ | 1.17 | 1.31 | 1.02 | 1.11 | 1.00 | 1.50 | 0.98 |
| PCF (%) | 61 | 53 | 70 | 62 | 69 | 47 | 73 |
| CTE, 25-800° C. ($10^{-7}$/° C.) | 7.4 | 8.1 | 9.8 | 10.4 | 10.7 | 14.3 | 12.6 |
| CTE, 500-900° C. ($10^{-7}$/° C.) | 14.3 | 14.9 | 16.6 | 17.2 | 17.5 | 21.0 | 19.3 |
| CTE, 200-1000 ($10^{-7}$/° C.) | — | — | — | — | — | — | — |
| $\Delta\alpha_{mc}$ based on $I_A$, 25-800° C. | 4.8 | 5.0 | 2.6 | 2.9 | 3.2 | 2.5 | 4.3 |
| $I_A$ | 0.37 | 0.40 | 0.38 | 0.37 | 0.38 | 0.39 | 0.42 |
| $I_T$ | 0.87 | 0.86 | 0.86 | 0.88 | 0.88 | 0.84 | 0.87 |
| $\Delta I = I_T - I_A$ | 0.50 | 0.46 | 0.48 | 0.51 | 0.50 | 0.45 | 0.45 |
| % Mullite | 0.9 | 1.2 | 1.0 | 1.9 | 2.7 | 2.5 | 1.4 |
| % Spinel + Sapphirine | 3.4 | 3.1 | 3.2 | 4.2 | 3.9 | 7.4 | 6.8 |
| % Alumina | 0.0 | 0.0 | 0.0 | 0.0 | 0.0 | 1.0 | 1.3 |
| $P_{MC}$ Parameter | 4.1 | 4.8 | 4.9 | 3.8 | 4.7 | 4.7 | 4.7 |
| $P_{ST}$ Parameter | 0.107 | 0.098 | 0.112 | 0.109 | 0.111 | 0.127 | 0.120 |

Examples C1-C4 (labeled C standing for Comparative) in Table 9 above illustrate properties typical of microcracked cordierite ceramics utilized in the "prior art" for ceramic honeycombs. The $\Delta\alpha_{mc}$ values in the axial directions of these examples indicate an extensive level of microcracking. Inventive Examples 1-55 shown in Tables 3-9 (batches) and 11-18 (properties) according to the present invention are representative of ceramic honeycomb bodies exhibiting a relatively lower degree of microcracking and relatively high thermal shock values, and may also include higher thermal expansion coefficients (as compared to highly microcracked cordierite materials), such as CTE between $7 \times 10^{-7}$/° C. and $15 \times 10^{-7}$/° C. (25-800° C.).

Figure 13:
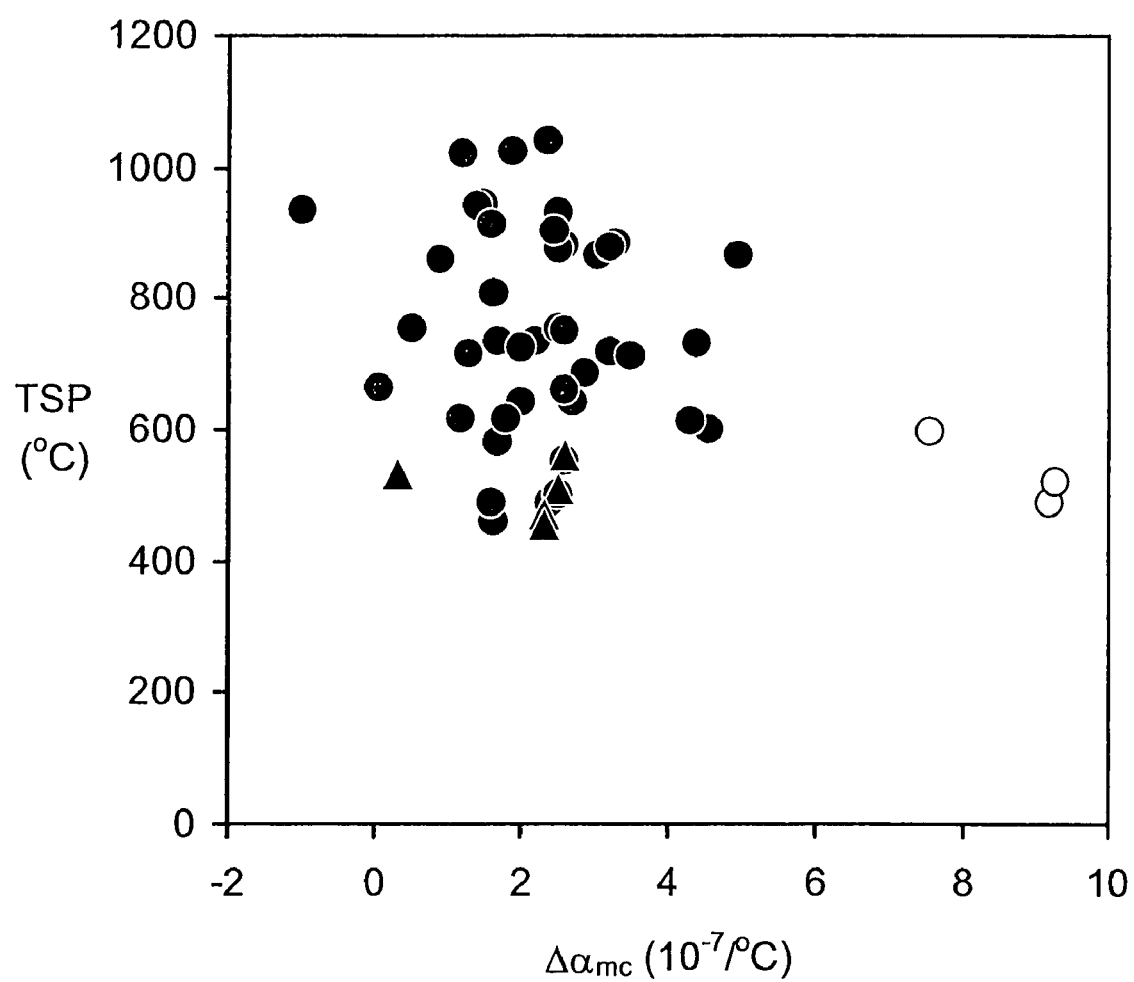
FIG. 13 is a plot of the thermal shock parameter, TSP (° C.), versus $\Delta\alpha_{mc}$ ($10^{-7}$/° C.) for inventive (filled circles and triangles) and comparative (open circles) examples.

Values of the delta CTE microcracked parameter, $\Delta\alpha_{mc}$, of less than 5.0 also indicate a relatively low level of microcracking. Lower (less positive) values of $\Delta\alpha_{mc}$ indicate a relatively lesser degree of microcracking is likely to be present in the body. Values of $\Delta\alpha_{mc} \leq 4.8$, $\Delta\alpha_{mc} \leq 3.5$, $\Delta\alpha_{mc} \leq 3.0$, or even $\Delta\alpha_{mc} \leq 2.0$ express very low amounts of microcracking and are often associated with higher TSP (FIG. 13). Even $\Delta\alpha_{mc} \leq 1.0$ may be provided by embodiments of the invention when very low microcracked bodies are desired.

Another indicator of the degree of microcracking present in the walls of the honeycomb body is the $E_{ratio\ 1000}$ or the $E_{ratio\ 900}$, wherein $E_{ratio\ 1000} = E_{1000°\ C.}/E_{RT}$ and wherein $E_{ratio\ 900} = E_{900°\ C.}/E_{RT}$, wherein $E_{RT}$ is the room temperature elastic modulus, $E_{900°\ C.}$ is the elastic modulus at 900° C., and $E_{1000°\ C.}$ is the elastic modulus at 1000° C. FIG. 8 of the drawing plots the "normalized" CTE values (25-800° C.) (i.e., expansions adjusted for secondary phases [% phases]) versus the measured axial I-ratios ($I_A$) for selected examples of the invention, and indicates the differences in microcracking as between Example C1-C3 and the inventive examples of Table 10-16. The trend line in FIG. 8 denotes the approximate trend in CTE v. Axial I-ratio for non-microcracked cordierite honeycombs with no secondary phases. As should be understood, values of $E_{Ratio\ 1000} \leq 1.05$ are desired to achieve low levels of microcracking. Values of $E_{Ratio\ 1000} \leq 1.01$, $E_{Ratio\ 1000} \leq 1.00$, $E_{Ratio\ 1000} \leq 0.97$, $E_{Ratio\ 1000} \leq 0.95$, $E_{Ratio\ 1000} \leq 0.93$, or even $E_{Ratio\ 1000} \leq 0.90$ may be achieved by embodiments of the invention. Many embodiments of the invention may achieve the desirable combination of $E_{Ratio} \leq 1.00$, and TSP$\geq 600°$ C., or even $E_{Ratio} \leq 0.97$ and TSP$\geq 700°$ C. FIG. 12 illustrates the very good correlation between the $E_{Ratio}$ and $Nb^3$ for low-microcracked ceramic materials. Accordingly, measured $E_{Ratio}$ is an excellent measure of the amount of microcracking present in a honeycomb structure.

The computed strain tolerance (MOR/E) for examples from Table 10-17, together with MOR/E data for additional cordierite ceramics outside of the scope of the invention, are plotted versus the Pore Connectivity Factor (PCF) in FIG. 5 of the drawings. From these data it is apparent that the combination of high levels of pore connectivity (via relatively high PCF) and relatively low levels of microcracking may yield relatively high values of MOR/E. This combination of relatively low microcracking and relatively high PCF is beneficial to achieve relatively high thermal shock resistance. For example, the low-microcracked inventive examples in box B lie at a higher MOR/E than the more microcracked comparative examples in Box A, demonstrating the benefit of reduced microcracking in raising MOR/E. Likewise, the higher MOR/E of the inventive examples in Box C relative to those in Box B illustrate the benefit of high PCF in further increasing the strain tolerance. Thus, it has been discovered that low-microcracked bodies exhibiting relatively narrow pore size distributions of the total porosity in accordance with one broad aspect of the invention are desired.

Figure 14:
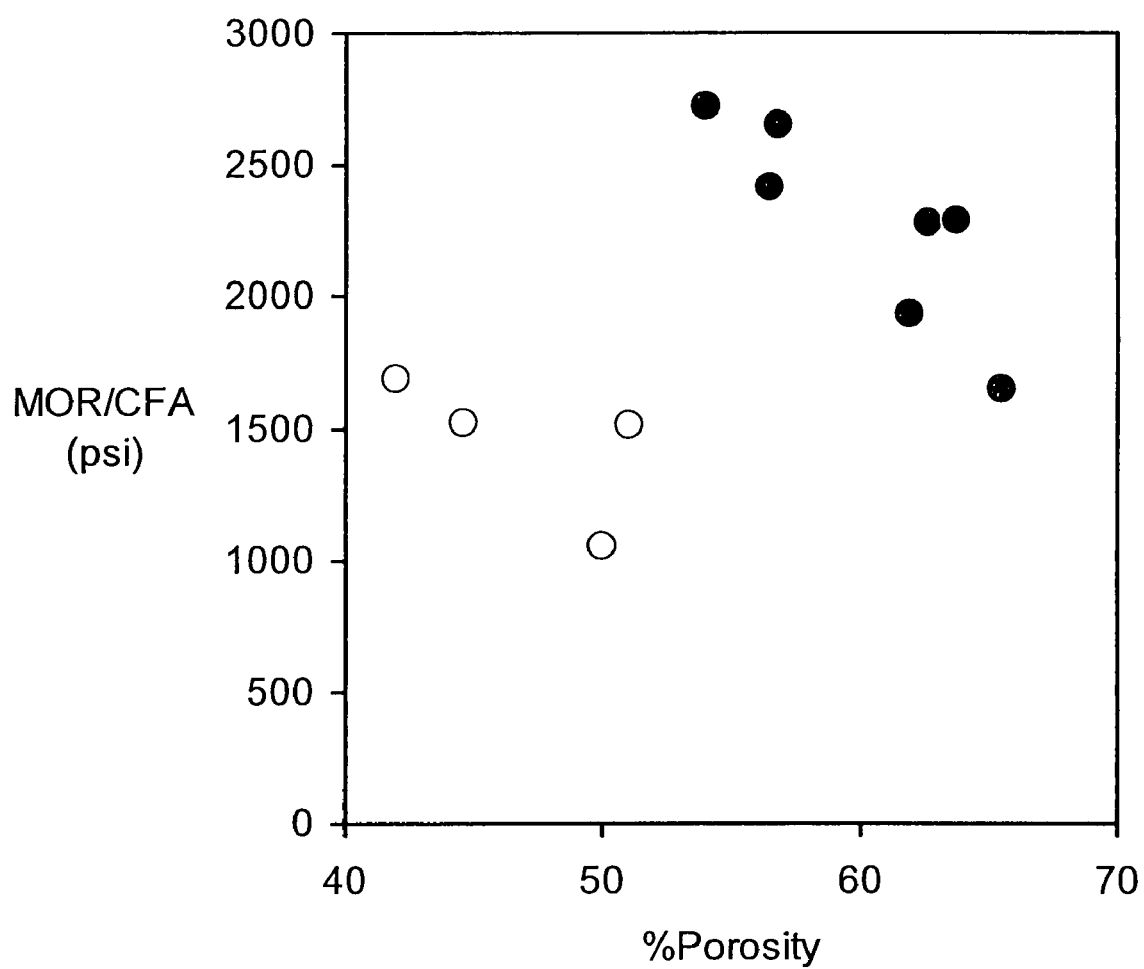
FIG. 14 is a plot of MOR/CFA (psi) versus % porosity (%) for inventive (filled circles and triangles) and comparative (open circles) examples having 11 $\mu m \leq d_{50} \leq 15$ $\mu m$.

Additionally, according to embodiments of the invention, the porous ceramic honeycomb may further comprise MOR/CFA$\geq 1000$ psi on a cellular bar, wherein MOR is the room temperature modulus of rupture strength (psi), and CFA is the closed frontal area fraction (wall area in axial cross section (excluding plugs) divided by the total area of the ceramic honeycomb). In other embodiments, MOR/CFA$\geq 1500$ psi, MOR/CFA$\geq 2000$ psi on a cellular bar, or even MOR/CFA$\geq 2500$ psi on a cellular bar. FIG. 14 illustrates that, for cordierite honeycomb bodies having 11 $\mu$m$\leq d_{50} \leq 15$ $\mu$m, low-microcracked inventive bodies with 54-66% porosity possess MOR/CFA strengths that are as high, or higher, than those of conventional highly microcracked cordierite honeycombs having only 42-51% porosity.

Certain exemplary embodiments exhibit a combination of attributes which result in a relatively high porosity honeycomb structure having good thermal shock and relatively low through-the-wall backpressure characteristics. These embodiments are excellent candidates for particulate filter applications. In particular, certain embodiments exhibit cordierite crystallites in walls of the honeycomb structure which have a preferred crystal orientation whereby $\Delta_I \geq 0.1$ wherein $\Delta_I = I_T - I_A$, CTE$\leq 15 \times 10^{-7}/°$ C. between 25-800° C., % P$\geq 46$%, a pore size distribution characterized by a pore connectivity factor (PCF)$>65$%, and TSP$\geq 550°$ C.

Figure 15:
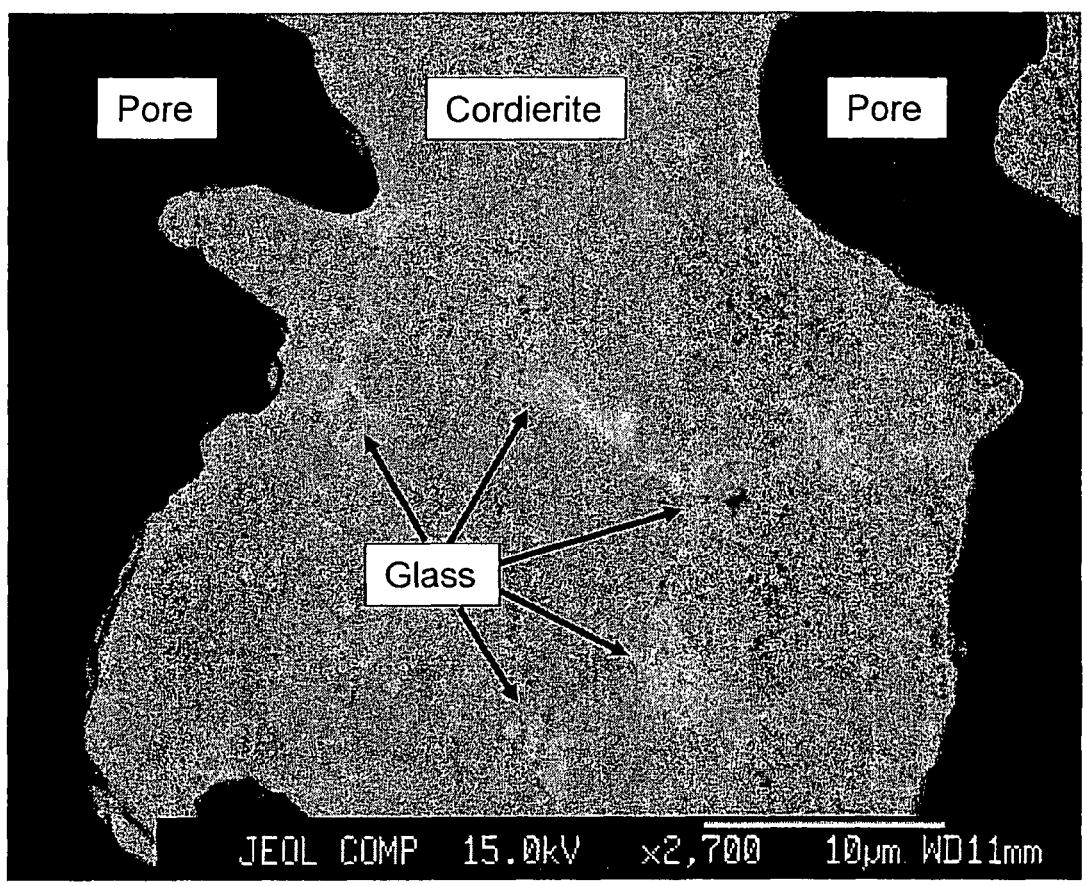
FIG. 15 is a scanning electron micrograph view of a polished cross-section of the honeycomb wall of inventive example.

In summary, increasing the pore connectivity (as measured by increased PCF) of these non-microcracked cordierite honeycomb ceramics helps to reduce the elastic modulus, and to increase the strain tolerance of the porous material. This enables the use of higher-expansion, low-microcracked cordierites while maintaining a sufficiently high thermal shock resistance for many combustion engine pollution control applications. Additionally, the presence of an intercrystalline glass phase has been discovered to further reduce microcracking and increase strength and strain tolerance in the inventive bodies. An illustration of the intercrystalline glass phase for an inventive example employing 5% of an aftapulgite clay in the raw material mixture is shown in FIG. 15. FIG. 15 is a scanning electron micrograph view of a polished cross-section of the honeycomb wall of inventive example I29 showing the pores (black), cordierite matrix (gray), and intercrystalline glass phase (bright angular regions). Scale bar in lower right is 10 microns.

Further, randomly oriented embodiments of the present inventive ceramic bodies lack a high degree of preferred crystallite orientation, exhibit reduced microcracking, and possess well interconnected porosity. As a result, the microstructure of the skin and matrix are similar in such embodiments. This may help reduce physical properties differences that can induce stress giving rise to skin defects, such as cracking. The desirable pore morphologies of these ceramic honeycombs may additionally improve filtration efficiency and reduce pressure drops in clean and soot-loaded ceramic filters.

Further advantages of such low-microcracked ceramic honeycombs may include high mechanical strength, strength being particularly important for thin-walled, low-cell density, and/or high porosity structures that are needed for reduced exhaust back pressure (such as in wall-flow filters), or for reduced thermal mass (for faster catalyst light-off), and/or for high catalyst loading capacities. The minimization of, or relative absence of, microcracks additionally stabilizes the structures against properties (or at least makes them less sensitive to) changes arising from the application of catalyst coatings and/or the accumulation of non-combustible particulates present in exhaust gases. The lack of a dependence of thermal shock on microcracking may provide more consistent products and possibly fewer manufacturing upsets.

What is claimed is:
1. A porous ceramic honeycomb structure, comprising:
a primary cordierite ceramic phase exhibiting
$E_{ratio} \leq 1.05$, wherein $E_{ratio} = E_H/E_{RT}$, wherein ($E_{RT}$) is a room temperature elastic modulus at 25° C., and ($E_H$) is a high temperature elastic modulus at 1000° C., and
TSP$\geq 525°$ C. wherein (TSP) is a thermal shock parameter defined as

$$TSP = MOR_{RT}/[E_{RT}][CTE_H]$$

($MOR_{RT}$) is a room temperature modulus of rupture strength, and ($CTE_H$) is a high temperature thermal expansion coefficient between 500-900° C.

2. The porous ceramic honeycomb of claim 1 wherein cordierite crystallites in walls of the honeycomb structure have a random orientation exhibiting $\Delta_I \leq 0.1$ wherein $\Delta_I = I_T - I_A$.

3. The porous ceramic honeycomb of claim 1 wherein cordierite crystallites in walls of the honeycomb structure have a preferred orientation exhibiting $\Delta_I > 0.1$ wherein $\Delta_I = I_T - I_A$.

4. The porous ceramic honeycomb of claim 1 wherein walls of the honeycomb structure further comprise $I_A \leq 0.6$.

5. The porous ceramic honeycomb of claim 4 wherein walls of the honeycomb structure further comprise $I_A \leq 0.5$.

6. The porous ceramic honeycomb in accordance with claim 1 wherein walls of the honeycomb structure further comprise $I_T \geq 0.7$.

7. The porous ceramic honeycomb of claim 1 wherein cordierite crystallites in walls of the honeycomb structure have a preferred orientation exhibiting $\Delta_I \geq 0.2$ wherein $\Delta_I = I_T - I_A$.

8. The porous ceramic honeycomb of claim 7 wherein cordierite crystallites in walls of the honeycomb structure have a preferred orientation exhibiting $\Delta_I \geq 0.3$ wherein $\Delta_I = I_T - I_A$.

9. The porous ceramic honeycomb of claim 7 further comprising $CTE \leq 15 \times 10^{-7}/°C$. between 25-800° C.

10. The porous ceramic honeycomb of claim 9 further comprising $CTE \leq 12 \times 10^{-7}/°C$. between 25-800° C.

11. The porous ceramic honeycomb of claim 9 further comprising $CTE \leq 9 \times 10^{-7}/°C$. between 25-800° C.

12. The porous ceramic honeycomb of claim 9 further comprising $7 \times 10^{-7}/°C. \leq CTE \leq 15 \times 10^{-7}/°C$. between 25-800° C.

13. The porous ceramic honeycomb of claim 1 wherein the honeycomb structure exhibits a pore microstructure having $d_{50} \leq 10$ μm.

14. The porous ceramic honeycomb in accordance with claim 1 wherein the structure exhibits total porosity (% P) wherein % $P \geq 46\%$.

15. The porous ceramic honeycomb in accordance with claim 14 wherein the structure exhibits a total porosity $\geq 55\%$.

16. The porous ceramic honeycomb in accordance with claim 14 wherein the structure exhibits a total porosity $\geq 60\%$.

17. The porous ceramic honeycomb in accordance with claim 14 wherein the structure exhibits a total porosity $\geq 65\%$.

18. The porous ceramic honeycomb in accordance with claim 1 wherein the structure exhibits
$d_{50} \geq 8$ μm, and
a total porosity $\geq 50\%$.

19. The porous ceramic honeycomb in accordance with claim 1 wherein a pore size distribution of the porosity is characterized by $d_f \leq 0.40$, wherein $d_f = (d_{50} - d_{10})/d_{50}$.

20. The porous ceramic honeycomb in accordance with claim 19 wherein a pore size distribution of the porosity is further characterized by $d_f \leq 0.35$.

21. The porous ceramic honeycomb in accordance with claim 19 wherein a pore size distribution of the porosity is characterized by $d_f \leq 0.30$, wherein $d_f = (d_{50} - d_{10})/d_{50}$.

22. The porous ceramic honeycomb in accordance with claim 19 wherein a pore size distribution of the porosity is further characterized by $d_f \leq 0.25$.

23. The porous ceramic honeycomb in accordance with claim 1 wherein a pore size distribution of the porosity is characterized by $d_b \leq 1.23$, wherein $d_b = (d_{90} - d_{10})/d_{50}$.

24. The porous ceramic honeycomb in accordance with claim 23 wherein a pore size distribution of the porosity is further characterized by $d_b \leq 1.0$.

25. The porous ceramic honeycomb in accordance with claim 23 wherein a pore size distribution of the porosity is further characterized by $d_b \leq 0.8$.

26. The porous ceramic honeycomb in accordance with claim 23 wherein a pore size distribution of the porosity is further characterized by $d_b \leq 0.7$.

27. The porous ceramic honeycomb in accordance with claim 1 wherein a pore size distribution of the porosity is characterized by a pore connectivity factor $(PCF) \geq 40\%$.

28. The porous ceramic honeycomb in accordance with claim 27 further characterized by a pore connectivity factor $(PCF) \geq 60\%$.

29. The porous ceramic honeycomb in accordance with claim 27 wherein a pore size distribution of the porosity is characterized by a pore connectivity factor $(PCF) \geq 70\%$.

30. The porous ceramic honeycomb in accordance with claim 27 further characterized by a pore connectivity factor $(PCF) \geq 80\%$.

31. The porous ceramic honeycomb in accordance with claim 1 wherein
$MOR_{RT}/E_{RT} \geq 0.10 \times 10^{-2}$.

32. The porous ceramic honeycomb in accordance with claim 31 wherein
$MOR_{RT}/E_{RT} \geq 0.14 \times 10^{-2}$.

33. The porous ceramic honeycomb in accordance with claim 31 wherein
$MOR_{RT}/E_{RT} \geq 0.18 \times 10^{-2}$.

34. The porous ceramic honeycomb in accordance with claim 1 wherein
$TSP \geq 550°$ C.

35. The porous ceramic honeycomb in accordance with claim 34 wherein
$TSP \geq 600°$ C.

36. The porous ceramic honeycomb in accordance with claim 34 wherein
$TSP \geq 800°$ C.

37. The porous ceramic honeycomb in accordance with claim 34 wherein
$TSP \geq 1000°$ C.

38. The porous ceramic honeycomb in accordance with claim 1 wherein the $_{ERatio} \leq 1.01$.

39. The porous ceramic honeycomb in accordance with claim 38 wherein the $E_{Ratio} \leq 0.95$.

40. The porous ceramic honeycomb in accordance with claim 38 wherein the $E_{Ratio} \leq 0.93$.

41. The porous ceramic honeycomb in accordance with claim 1 further comprising:
$E_{Ratio} \leq 1.00$, and
$TSP \geq 600°$ C.

42. The porous ceramic honeycomb in accordance with claim 1 further comprising:
$E_{Ratio} \leq 0.98$, and
$TSP \geq 700°$ C.

43. The porous ceramic honeycomb in accordance with claim 1 further comprising:
$MOR/CFA \geq 1000$ psi on a cellular bar.

44. The porous ceramic honeycomb in accordance with claim 43 further comprising:
$MOR/CFA \geq 2000$ psi on a cellular bar.

45. The porous ceramic honeycomb in accordance with claim 1 wherein the primary ceramic phase is substantially free of microcracks the value of the microcrack thermal expansion differential $\Delta\alpha_{mc} \leq 5.0$.

46. The porous ceramic honeycomb in accordance with claim 45 further comprising $\Delta\alpha_{mc} \leq 3.0$.

47. The porous ceramic honeycomb in accordance with claim 45 further comprising $\Delta\alpha_{mc} \leq 2.0$.

48. The porous ceramic honeycomb in accordance with claim 45 further comprising $\Delta\alpha_{mc} \leq 1.0$.

49. The porous ceramic honeycomb in accordance with claim 1 wherein:
cordierite crystallites in walls of the honeycomb structure have a preferred orientation whereby $\Delta_I \geq 0.1$ wherein $\Delta_I = I_T - I_A$,
$CTE \leq 15 \times 10^{-7}/°C$. between 25-800° C.,
% P $\geq$ 46%,
a pore size distribution characterized by a pore connectivity factor (PCF) $\geq$ 65%, and
TSP $\geq$ 550° C.

50. The porous ceramic honeycomb in accordance with claim 1 wherein:
cordierite crystallites in walls of the honeycomb structure have a preferred orientation whereby $\Delta_I \geq 0.1$ wherein $\Delta_{I=IT} - I_A$,
48% $\leq$ % P $\leq$ 56%,
a pore size distribution characterized by a pore connectivity factor (PCF) $\geq$ 35% and $d_f \leq 0.40$ wherein PCF=% P/$d_b$, $d_f = (d_{50} - d_{10})/d_{50}$, and $d_b = (d_{90} - d_{10})/d_{50}$, and
TSP $\geq$ 600° C.

51. A porous ceramic honeycomb in accordance with claim 1 wherein:
cordierite crystallites in walls of the honeycomb structure have a preferred orientation whereby $\Delta_I \geq 0.1$ wherein $\Delta_I = I_T - I_A$,
% P $\geq$ 60%,
a pore size distribution characterized by a pore connectivity factor (PCF) $\geq$ 50% wherein PCF=% P/$d_b$ and $d_b = (d_{90} - d_{10})/d_{50}$, and
TSP $\geq$ 600° C.

52. A porous ceramic honeycomb structure, comprising:
a primary cordierite ceramic phase exhibiting low microcracking as exhibited by $\Delta\alpha_{mc} \leq 5.0$,
$CTE(25\text{-}800° C.) \leq 15 \times 10^{-7}/°C$. and
% P $\geq$ 46%.

53. A porous ceramic honeycomb structure of claim 52, further comprising:
a pore size distribution characterized by a pore connectivity factor (PCF) $\geq$ 60% wherein PCF=% P/$d_b$ and $d_b = (d_{90} - d_{10})/d_{50}$.

54. A porous ceramic honeycomb structure of claim 52, further comprising:
$\Delta I > 0.1$ wherein $\Delta I = I_T - I_A$.

* * * * *